(12) United States Patent
Ström

(10) Patent No.: US 7,787,691 B2
(45) Date of Patent: *Aug. 31, 2010

(54) HIGH QUALITY IMAGE PROCESSING

(75) Inventor: Jacob Ström, Stockholm (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1139 days.

This patent is subject to a terminal disclaimer.

(21) Appl. No.: 11/401,444

(22) Filed: Apr. 11, 2006

(65) Prior Publication Data

US 2007/0237404 A1 Oct. 11, 2007

(51) Int. Cl.
 *G06K 9/36* (2006.01)
(52) U.S. Cl. .......... 382/166; 382/232; 382/233
(58) Field of Classification Search ........ 382/232, 382/233, 162, 165, 166, 167, 253; 348/254, 348/234, 362; 709/246, 203; 345/501
See application file for complete search history.

(56) References Cited

U.S. PATENT DOCUMENTS

| | | | |
|---|---|---|---|
| 5,444,800 A | 8/1995 | Kim | 382/239 |
| 5,748,904 A | 5/1998 | Juang et al. | 345/544 |
| 5,793,371 A | 8/1998 | Deering | 345/418 |
| 5,835,244 A | 11/1998 | Bestmann | 358/523 |
| 5,926,647 A | 7/1999 | Adams et al. | 712/36 |
| 5,956,431 A | 9/1999 | Iourcha et al. | 382/253 |
| 6,023,266 A | 2/2000 | Eglit et al. | 345/555 |
| 6,297,826 B1 | 10/2001 | Semba et al. | 345/589 |
| 6,404,923 B1 | 6/2002 | Chaddha | 382/224 |
| 6,505,256 B1 * | 1/2003 | York | 709/246 |
| 6,636,222 B1 | 10/2003 | Valmiki et al. | 345/505 |
| 6,658,146 B1 | 12/2003 | Iourcha et al. | 382/166 |
| 6,687,411 B1 | 2/2004 | Miura et al. | 382/250 |
| 7,251,360 B2 | 7/2007 | Takahashi | 382/167 |
| 7,463,296 B2 * | 12/2008 | Sun et al. | 348/254 |
| 7,522,767 B2 * | 4/2009 | Baker et al. | 382/167 |

(Continued)

FOREIGN PATENT DOCUMENTS

CN 1307782 A 8/2001

(Continued)

OTHER PUBLICATIONS

European Standard Search Report completed Aug. 30, 2006.

(Continued)

*Primary Examiner*—Anh Hong Do
(74) *Attorney, Agent, or Firm*—Nixon & Vanderhye P.C.

(57) ABSTRACT

In a high quality image-encoding scheme an input image is decomposed into several image blocks comprising multiple image elements. The image blocks are encoded into encoded block representations. Such a block representation comprises two color codewords, a color modifying codeword and optionally a sequence of color indices and color modifier indices. The color codewords define multiple discrete color representations along a line in color space. The color modifying codeword represents a set of multiple color modifiers for modifying the multiple color representations along at least one extension vector to obtain, for each color representation, a set of multiple color points. These color points of the multiple sets are located on a surface defined by the multiple color representations and the at least one extension vector. The colors of the image elements in the block are then approximated by these color points on the surface.

43 Claims, 14 Drawing Sheets

U.S. PATENT DOCUMENTS

| | | | |
|---|---|---|---|
| 2003/0053706 A1 | 3/2003 | Hong et al. | 382/253 |
| 2003/0090709 A1 | 5/2003 | Rijavec | 382/164 |
| 2004/0218812 A1 | 11/2004 | Douglas | 382/166 |
| 2007/0019869 A1 | 1/2007 | Strom et al. | 382/233 |
| 2007/0071333 A1 | 3/2007 | Strom et al. | 382/232 |
| 2007/0127812 A1 | 6/2007 | Strom | 382/232 |
| 2007/0140554 A1 | 6/2007 | Strom et al. | 382/166 |
| 2007/0237404 A1 | 10/2007 | Strom | 382/232 |

FOREIGN PATENT DOCUMENTS

| | | |
|---|---|---|
| EP | 0 739 139 | 10/1996 |
| EP | 1 118 963 A1 | 7/2001 |
| WO | WO 2005/059836 A1 | 6/2005 |
| WO | WO 2006/006915 | 1/2006 |
| WO | WO2006/126949 A1 | 11/2006 |
| WO | WO 2007/021227 A1 | 2/2007 |
| WO | WO 2007/117206 | 3/2007 |

OTHER PUBLICATIONS

Pettersson et al., "Texture Compression: THUMB—Two Hues Using Modified Brightness", XP-002396817, pp. 7-12.

Ström et al., "iPackman: High-quality, Low-Complexity Texture Compression for Mobile Phones", XP-002396818, Graphics Hardware, Jul. 30-31, 2005, pp. 64-70.

International Application Status Report in Application No. PCT/SE2007/050127, Mar. 20, 2007.

International Search Report in International Application No. PCT/SE2007/050127, Oct. 30, 2007.

International Search Report for PCT/SE2004/001920 dated Apr. 6, 2005.

U.S. Appl. No. 10/582,988, filed Jun. 15, 2006; Inventor: Strom.
U.S. Appl. No. 10/583,454, filed Jun. 19, 2006; Inventor: Strom.
U.S. Appl. No. 10/583,453, filed Jun. 19, 2006; Inventor: Strom.
U.S. Appl. No. 10/582,689, filed Jun. 13, 2006; Inventor: Strom.
U.S. Office Action mailed Mar. 9, 2009 in related U.S. Appl. No. 10/582,988.
U.S. Office Action mailed Mar. 3, 2009 in related U.S. Appl. No. 10/583,453.
U.S. Office Action mailed Mar. 16, 2009 in related U.S. Appl. No. 10/583,454.
Delp et al, "Image Compression Using Block Truncation Coding", IEEE Transactions on Communications, vol. COM-27, No. 9, Sep. 1979, pp. 1335-1342.
Campbell et al, "Two BIT/Pixel Full Color Encoding", Dallas, Aug. 18-22, vol. 20, No. 4, 1986, pp. 215-223.
Fenney, "Texture Compression Using Low-Frequency Signal Modulation", Graphics Hardware (2003), © The Eurographics Association, 2003.
Akenine-Möller et al, "Graphics for the Masses: A Hardware Rasterization Architecture for Mobile Phones", *ACM Transactions of Graphics (Proceedings of ACM SIGGRAPH)*, vol. 22, No. 3, Jul. 2003, pp. 801-808.
Chinese Office Action mailed Mar. 7, 2008 in corresponding CN application 200480038094.6.
Y. Linde, A. Buzo and R. Gray, "An algorithm for vector quantizer design", *IEEE Transactions on Communications*, vol. 28, pp. 84-94, Jan. 1980.
Said et al, "A New, Fast, and Efficient Image Codec Based on Set Partitioning in Hierarchical Trees", IEEEE Transactions on Circuits and Systems for Video Technology, vol. 6, No. 3, Jun. 1996, pp. 243-250.

\* cited by examiner

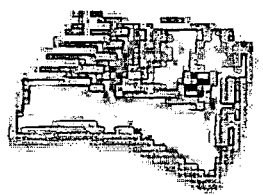 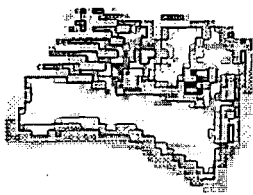 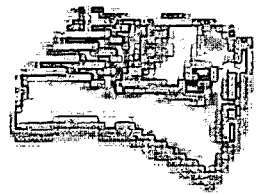
Fig. 1A　　　Fig. 1B　　　Fig. 1C
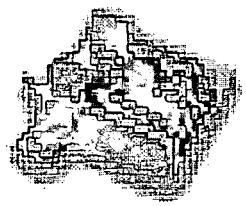 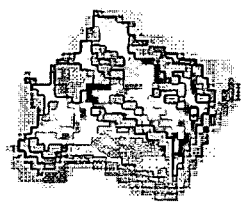 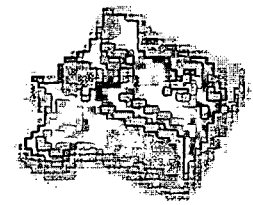
Fig. 2A　　　Fig. 2B　　　Fig. 2C
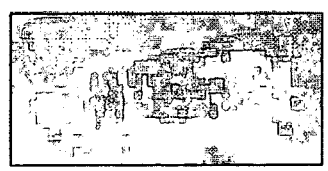 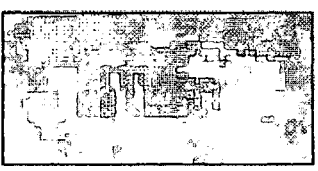 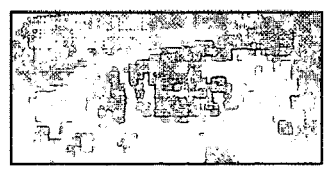
Fig. 3A　　　Fig. 3B　　　Fig. 3C
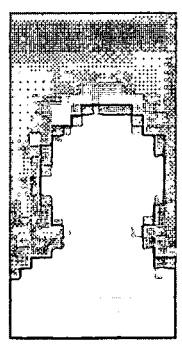 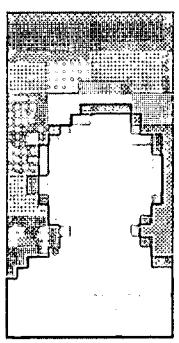 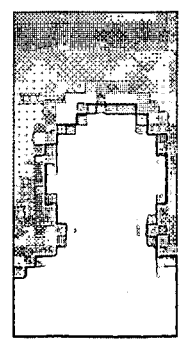
Fig. 4A　　Fig. 4B　　Fig.4C

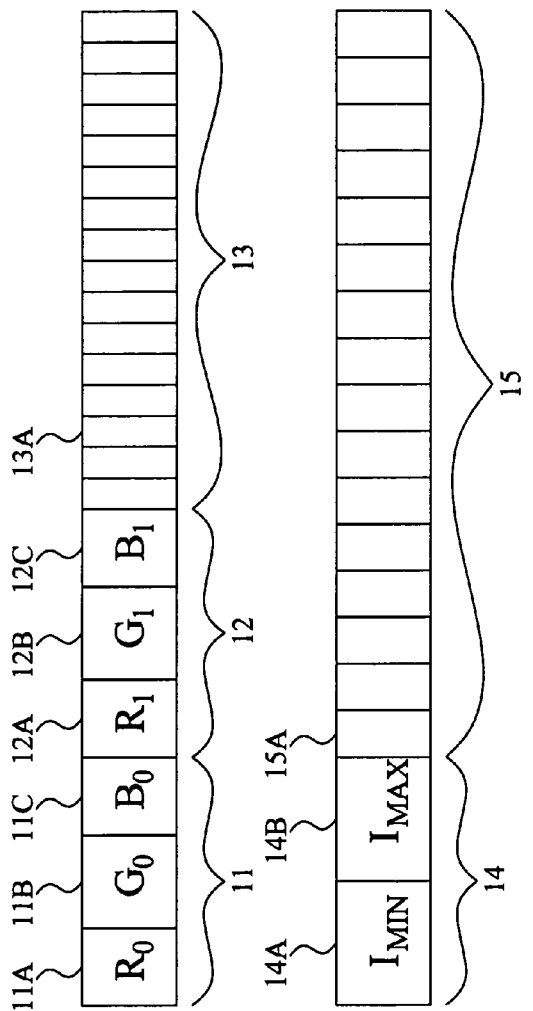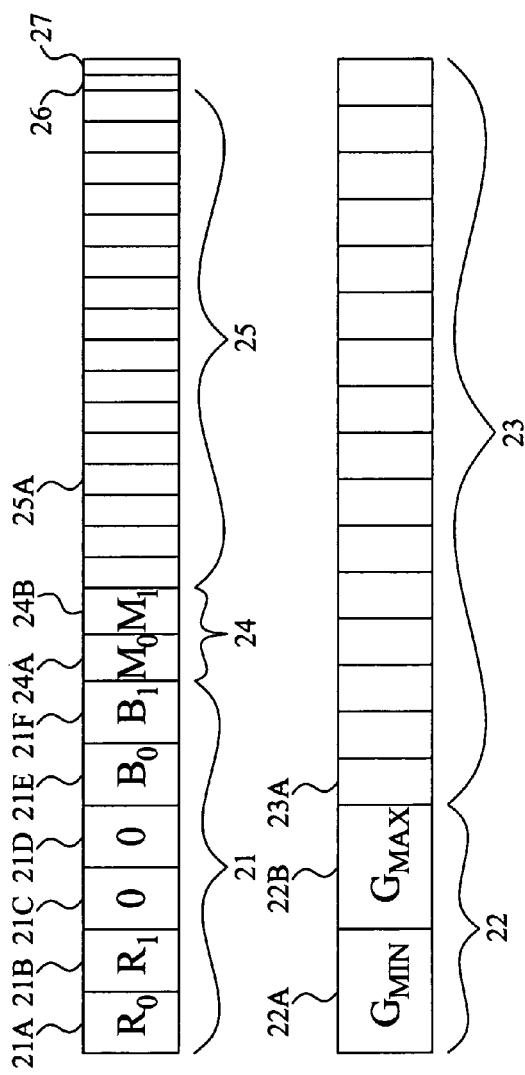

HIGH QUALITY IMAGE PROCESSING

TECHNICAL FIELD

The present invention generally refers to image processing, and in particular to methods and systems for encoding and decoding images at a high image quality.

BACKGROUND

Presentation and rendering of images and graphics on data processing systems and user terminals, such as computers, and in particular on mobile terminals have increased tremendously the last years. For example, three-dimensional (3D) graphics and images have a number of appealing applications on such terminals, including games, 3D maps and messaging, screen savers and man-machine interfaces.

A 3D graphics rendering process typically comprises three sub-stages. Briefly, a first stage, the application stage, creates several triangles. The corners of these triangles are transformed, projected and lit in a second stage, the geometry stage. In a third stage, the rasterization stage, images, often denoted textures, can be "glued" onto the triangles, increasing the realism of the rendered image. The third stage typically also performs sorting using a z-buffer.

However, rendering of images and textures, and in particular 3D images and graphics, is a computationally expensive task in terms of memory bandwidth and processing power required for the graphic systems. For example, textures are costly both in terms of memory, the textures must be placed on or cached in fast on-chip memory, and in terms of memory bandwidth, a texture can be accessed several times to draw a single pixel.

In order to reduce the bandwidth and processing power requirements, an image (texture) encoding method or system is typically employed. Such an encoding system should result in more efficient usage of expensive on-chip memory and lower memory bandwidth during rendering and, thus, in lower power consumption and/or faster rendering.

DESCRIPTION OF RELATED ART

Delp and Mitchell [1] developed a simple scheme, called block truncation coding (BTC) for image compression. Even though their applications were not texture compression per se, several of the other schemes described in this section are based on their ideas. Their scheme compressed grey scale images by considering a block of 4×4 pixels at a time. For such a block, two 8-bit grey scale values were stored, and each pixel in the block then used a single bit to index to one of these grey scales. This resulted in 2 bits per pixel (bpp).

A simple extension, called color cell compression (CCC), of BTC was presented by Campbell et al. [2]. Instead of using an 8-bit grey scale value, the 8-bit value is employed as an index into a color palette. This allows for compression of colored textures at 2 bpp. However, a memory lookup in the palette is required, and the palette is restricted in size.

The S3TC texture compression method by Iourcha et al. [3] is probably the most popular scheme. It is used in DirectX and there are extensions for it in OpenGL as well. Their work can be seen as a further extension of CCC. The block size for S3TC is 4×4 pixels that are compressed into 64 bits. Two base colors are stored in each 16 bits, and each pixel stores a two-bit index into a local color set that consists of the two base colors and two additional colors in-between the base colors. This means that all colors lie on a line in RGB space. S3TC's compression rate is 4 bpp. One disadvantage of S3TC is that only four colors can be used per block.

PACKMAN is a recent texture compression method developed by Strom and Akenine-Möller [4]. It encodes a block of 2×4 texels (pixels) into 32 bits. Only one color is used per block, but in each pixel this color can be modified in intensity. The major goal of PACKMAN was to allow for minimal decompression complexity. The major problem in terms of quality with this method is that the chrominance is heavily quantized, which may introduce block artifacts.

In order to mitigate the drawbacks of PACKMAN, Strom and Akenine-Möller developed an improved compression method denoted iPACKMAN/Ericsson Texture Compression (ETC) [5, 6]. In iPACKMAN two 2×4 image blocks are encoded in common, which allowed for differential encoding of the colors. This made it possible to have finer quantization of the colors, resulting in an increase in quality of about 3 dB. Hence, this compression method passed S3TC in terms of quality and is currently the highest quality texture compression method/system publicly known.

Despite the relative high quality obtainable by PACKMAN, iPACKMAN and S3TC, this quality is still not enough for some applications. For instance, it is expected that the entire user interface of mobile terminals and telephones will run using 3D hardware. This allows for effects that not only look good, but can also be more intuitive for the user than ordinary 2D interfaces. However, one of the problems of running the user interface on the 3D hardware is the limited memory bandwidth. Furthermore, it is expected that the quality of today's texture compression schemes may not be good enough for compression of user interface constants and textures. For example, icons and other small graphical symbols are usually very colorful and of high contrast, which does not work well with most compression schemes.

The are also applications, such as games on personal computers and game consoles, where compression of some textures with the most widely used scheme, S3TC, does not give enough quality.

SUMMARY

There is thus a need for a high-quality compression scheme or a high-quality mode that can be used in connection with existing compression schemes.

The technology described herein overcomes these and other drawbacks of the prior art arrangements.

It is a general object invention to provide an efficient image processing.

It is another object to provide an efficient image encoding and image decoding.

Yet another object is to provide image encoding and decoding adapted for usage in high quality applications.

These and other objects are met by the invention technology described herein.

Briefly, the technology described herein involves a high quality image processing in the form of encoding (compressing) an image and decoding (decompressing) an encoded (compressed) image.

An image to be encoded is decomposed into a number of image blocks comprising multiple image elements (pixels, texels or voxels). An image block preferably comprises sixteen image elements and has a size of $2^m \times 2^n$ image elements, where m and n preferably are 2. Each image element in a block is characterized by an image element property, preferably a color, e.g. a 24-bit RGB (red, green, blue) color. The image blocks are then encoded.

In this high quality (lossy) block encoding, at least a first and a second color codeword is determined. These color codeword are representations of and define multiple, i.e. at least two, discrete color representations or values along a line in a color space. This line further has an associated direction vector in color space.

A color modifying codeword is also determined for the image block. This modifying codeword represents a set of multiple color modifiers that are used (during decoding) for modifying the discrete color representations represented by the color codewords. These multiple color modifiers, thus, are used for modifying the color representations along at least one selected extension vector in color space. This at least one selected extension vector is furthermore different from the direction vector. By modifying one of the multiple discrete color representations with the modifiers along an extension vector, a set of multiple color points or values are obtained. This means that modifying each of M discrete color representations with N color modifiers results in M different sets of N color points, where M, N are equal to or larger than two. The M×N color points of the sets are located on a surface in color space. This surface is furthermore defined based on the multiple color representations and the at least one extension vector. Alternatively, especially when the color representations are present on a plane in color space, the direction vector, the at least one selected extension vector and at least one of the color representations uniquely define the plane. The colors of the image elements in the block are then approximated by color points selected out of the M×N color points in the surface.

In a particular example embodiment, the M×N color points of the sets collectively form an equispaced or a non-equispaced grid on the surface in color space.

Having access to multiple color points present on a surface instead of being limited to multiple color points along a line in color space (as S3TC/DXT and iPACKMAN/ETC) allows for a much more accurate representation or approximation of the colors of the image elements in the block. This higher degree of freedom in selecting color values on a surface as compared to a line is a cause of the increase in quality obtainable by the technology described herein.

Furthermore, a color index and a color modifier index are preferably determined for each image element in the block. The color index is then associated with one of the multiple color representations defined by the two color codewords. Correspondingly, the color modifier index is associated with one of the multiple color modifiers in the modifier set defined by the color modifying codeword. The two indices for each image element are used for identifying, which of the multiple color points on the color surface to use as a representation for the original (RGB888) color of that image element.

In an embodiment, the color modifying codeword represents a minimum and a maximum color modifier value. The multiple color modifiers of the set can then be calculated as linear combinations of the maximum and minimum modifier value.

In another embodiment, the color modifying codeword is a table index identifying the set of multiple color modifiers from a table comprising multiple such different modifier sets.

Correspondingly, in an embodiment, the two color codewords represent two color values. The multiple color representations are calculated as linear combinations of these two color values.

In another embodiment, the first color codeword represents a starting color value whereas the second color codeword is a table index into a table containing multiple different modifier sets, where each such modifier set comprises multiple modifiers. A direction codeword is also preferably determined. This direction codeword defines a direction, e.g. in the form of an angle or a direction vector, in color space. The multiple color representations are obtained by modifying the starting color value defined by the first color codeword with the modifiers from the modifier set provided using the second color codeword along the direction defined by the direction codeword.

In a particular embodiment, the at least one extension vector is the luminance vector in color space. In such a case, all luminance information is preferably removed from the two color codewords. This means that the two color codewords will only contain chrominance information, whereas the color modifying codeword will contain the luminance information. An even higher image quality is then obtainable. This can be realized by projecting the original colors of the image block, or the color of at least one image element in the block, onto a plane in color space. This plane preferably bases through the grey point in color space and is orthogonal to the luminance direction.

During decoding, the encoded image block(s) that should be decoded is identified and fetched from e.g. a memory location.

In an implementation, the two color codewords are used for determining the multiple discrete color representations that are present on a line in color space. The color modifying codeword allows provision of a set of multiple color modifiers. These multiple color modifiers are used for modifying each of the multiple color presentations along at least one (selected or predefined) extension vector to obtain multiple color points. These color points are located on a surface defined by the multiple color representations and the at least one extension vector, e.g. collectively form a grid on the surface. The particular color point to use as color value representation of an image element is then selected based on the color index and color modifier index assigned to the image element.

In another embodiment, the color index associated with an image element to be decoded is used together with the color codewords for generating a single color representation. Furthermore, a particular color modifier value to use for this image element is provided based on the color modifier index associated with the image element and the color modifying codeword. The generated color representation is then modified using the provided color modifier value along an extension vector associated with the color representation to calculate a color point. This calculated color point is, thus, the color value to use for the image element.

The technology described herein offers the following advantages:

Gives extremely high quality (peak signal/noise ratio) for different image types, including small and highly colorful images;

Increases the image quality with typically at least 5 dB as compared to today's top of the line image compressing schemes;

Can be used together with existing graphics hardware with no or only minor modifications of the hardware;

Can be forward compatible with DXT5 and ETC; and

Hardware implementation of decoding is simple.

Other advantages will be appreciated upon reading of the below description of the embodiments of the invention.

SHORT DESCRIPTION OF THE DRAWINGS

FIGS. 1A to 1C illustrate a comparison of an original book icon (FIG. 1A) and versions that have been compressed and decompressed by DXT1 (FIG. 1B) and the technology described herein (FIG. 1C);

FIGS. 2A to 2C illustrate a comparison of an original folder icon (FIG. 2A) and versions that have been compressed and decompressed by DXT1 (FIG. 2B) and the technology described herein (FIG. 2C);

FIGS. 3A to 3C illustrate a comparison of an original tube image (FIG. 3A) and versions that have been compressed and decompressed by DXT1 (FIG. 3B) and the technology described herein (FIG. 3C);

FIGS. 4A to 4C illustrate a comparison of an original face image (FIG. 4A) and versions that have been compressed and decompressed by DXT1 (FIG. 4B) and the technology described herein (FIG. 4C);

FIG. 9 is an illustration of a compressed representation of an image block;

FIG. 16 is an illustration of a compressed representation of an image block according to another embodiment;

Figure 29:
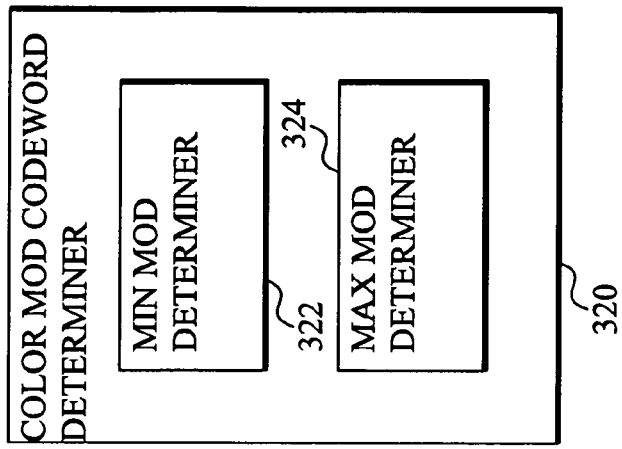
Figure 27:
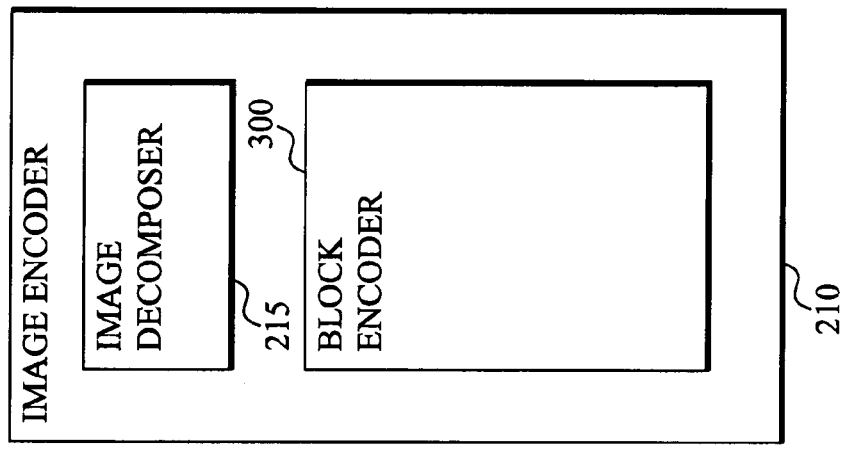
Figure 26:
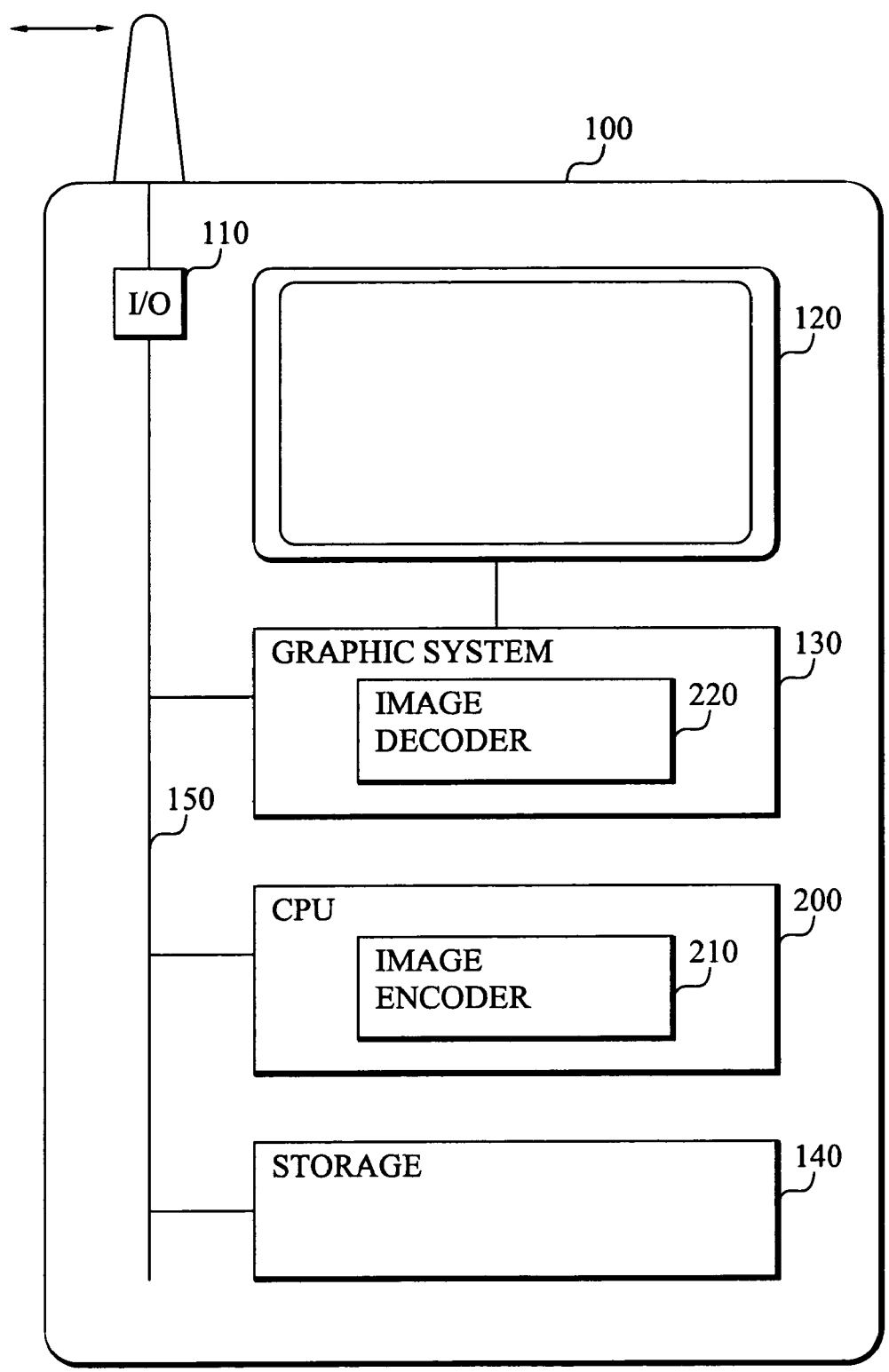
Figure 30:
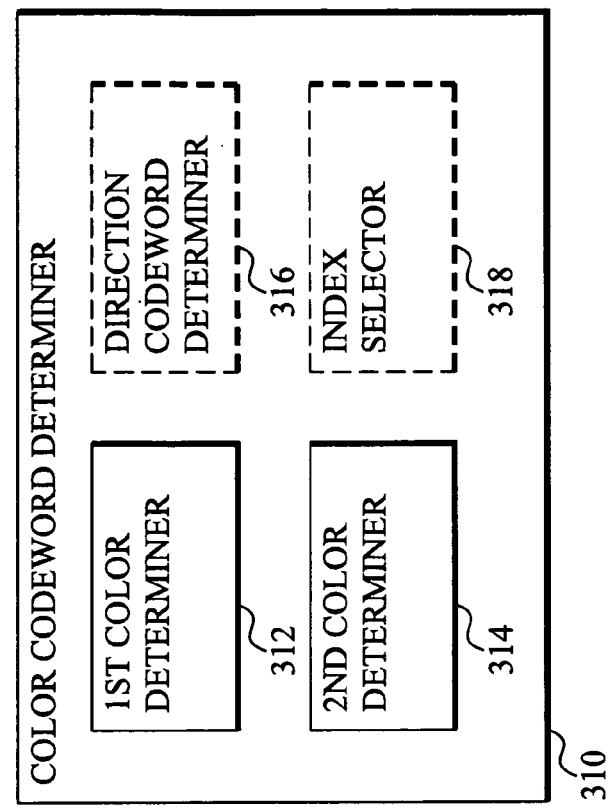
Figure 28:
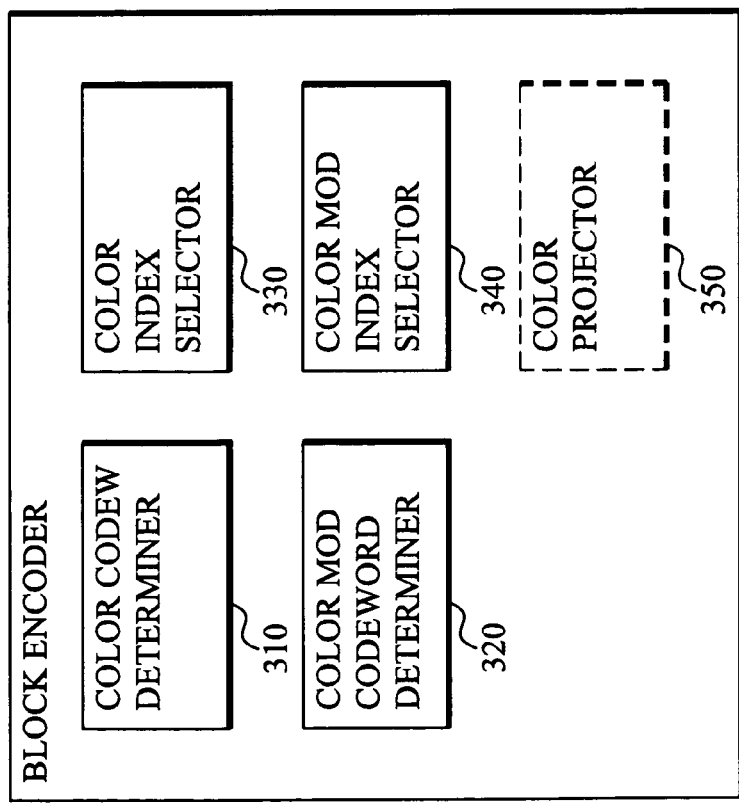
Figure 32:
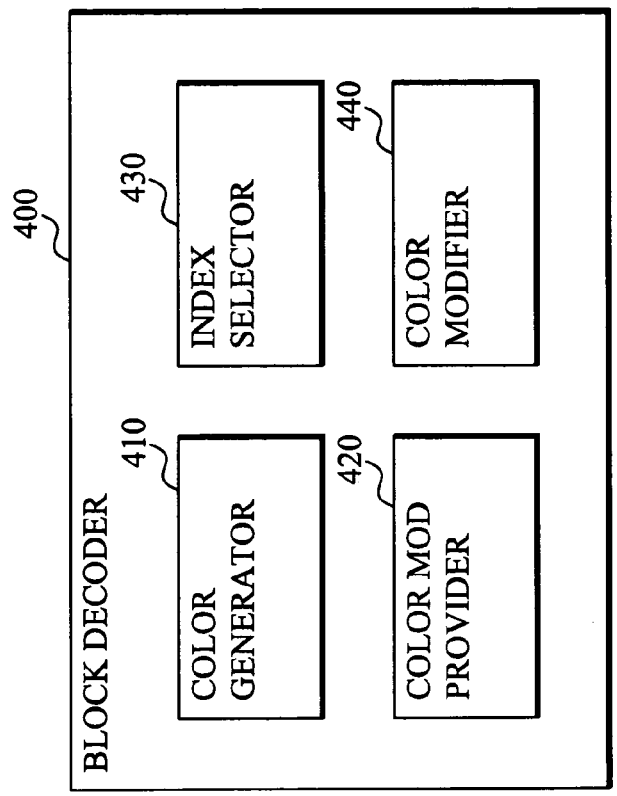
Figure 31:
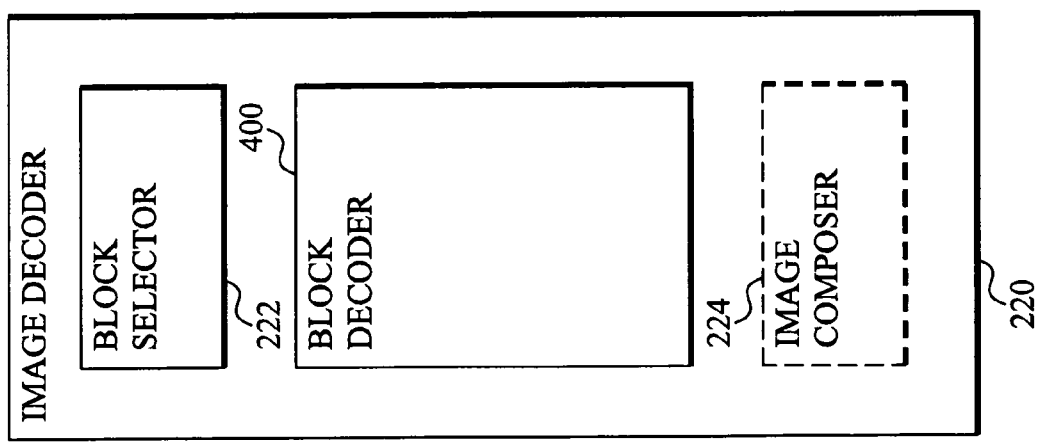
Figure 33:
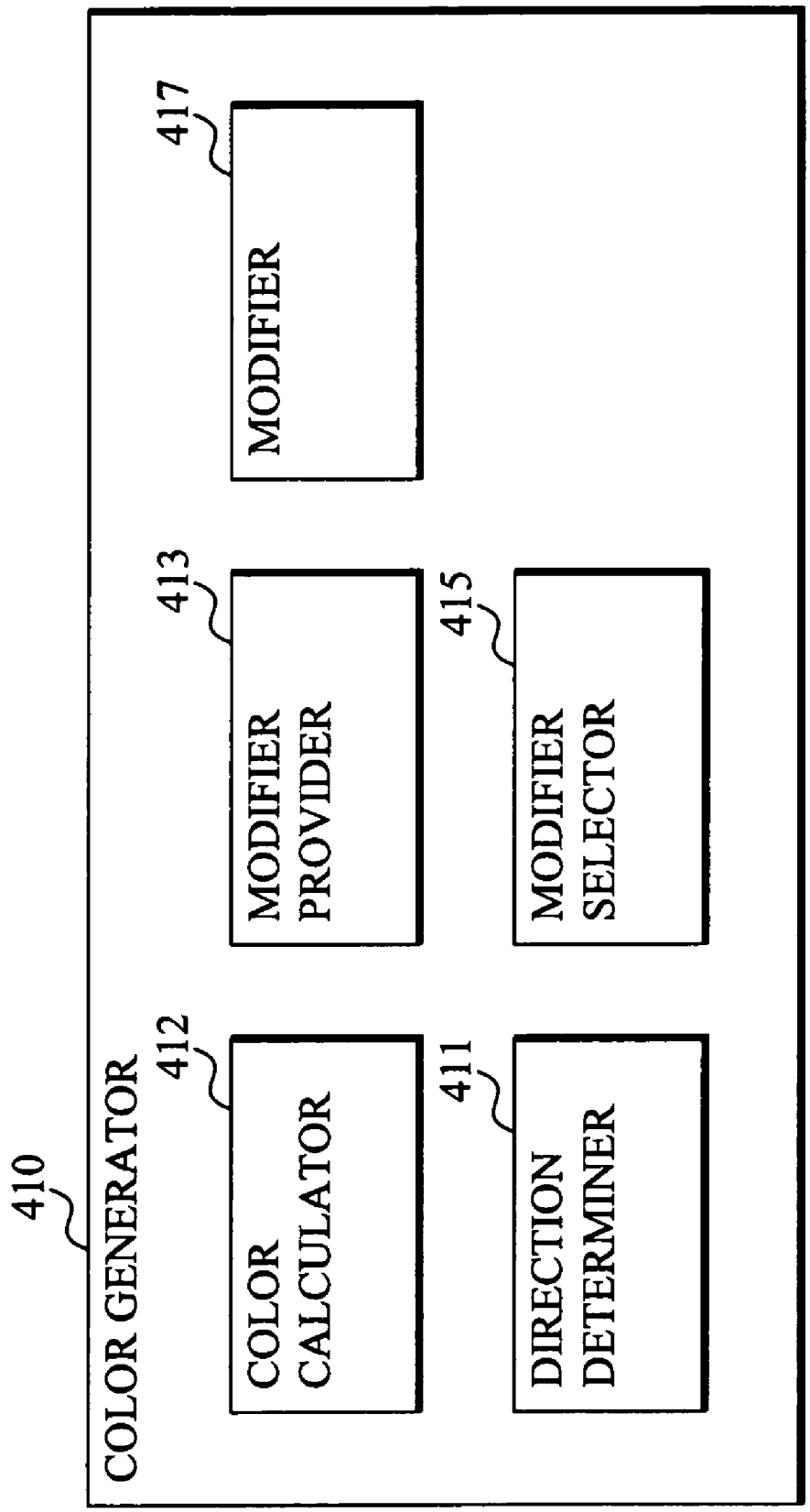

FIG. 26 schematically illustrates an example of a user terminal with an image encoder and decoder;

FIG. 27 is a block diagram schematically illustrating an embodiment of an image encoder;

FIG. 28 is a block diagram schematically illustrating an embodiment of a block encoder;

FIG. 29 is a block diagram schematically illustrating an embodiment of the color modifier codeword determiner of the block encoder of FIG. 28 in more detail;

FIG. 30 is a block diagram schematically illustrating an embodiment of the color codeword determiner of the block encoder of FIG. 28 in more detail;

FIG. 31 is a block diagram schematically illustrating an embodiment of an image decoder;

FIG. 32 is a block diagram schematically illustrating an embodiment of a block decoder; and FIG. 33 is a block diagram schematically illustrating an embodiment of the color generator of the block decoder of FIG. 32 in more detail.

DETAILED DESCRIPTION

Throughout the drawings, the same reference characters will be used for corresponding or similar elements.

The technology described herein relates to image and graphic processing, and in particular to high quality encoding or compressing images and decoding or decompressing encoded (compressed) images.

Generally, during image encoding, an image is decomposed or divided into a number of image blocks. Each such image block then comprises multiple image elements having, among others, a certain color. The image blocks are then encoded to generate an encoded representation of the image.

When an encoded image or graphic primitive subsequently is to be rendered, e.g. displayed on a screen, the relevant image elements of the encoded image blocks are identified and decoded. These decoded image elements are then used to generate a decoded representation of the original image or graphics primitive.

The technology described herein is well adapted for usage with three-dimensional (3D) graphics, such as games, 3D maps and scenes, 3D messages, e.g. animated messages, screen savers, man-machine interfaces (MMIs), etc., but is not limited thereto. Thus, the invention could also be employed for encoding other types of images or graphics, e.g. one-dimensional (1D), two-dimensional (2D) or 3D images.

In 3D graphics processing, typically several triangles are created and the corresponding screen coordinates of the corners of these triangles are determined. Onto each triangle, an image (or portion of an image), or a so-called texture, is mapped ("glued"). The management of textures is, though, costly for a graphic system, both in terms of utilized memory for storage of textures and in terms of memory bandwidth during memory accesses, when textures are fetched from the memory. This is a problem particularly for thin clients, such as mobile units and telephones, with limited memory capacity and bandwidth. As a consequence, a texture or image encoding scheme is often employed. In such a scheme, a texture is typically decomposed or divided into a number of image blocks comprising multiple texels. The image blocks are then encoded and stored in a memory. Note that the size of an encoded (version of an) image block is smaller than the corresponding size of the uncoded version of the image block.

In the application the expression "image element" refers to an element in an image block or encoded representation of an image block. This image block, in turn, corresponds to a portion of an image or texture. Thus, an image element could be a texel (texture element) of a (1D, 2D, 3D) texture, a pixel of a (1D or 2D) image or a voxel (volume element) of a 3D image. Generally, an image element is characterized by certain image-element properties, such as a color value. Furthermore, in the following, the term "image" is used to denote any 1D, 2D or 3D image or texture that can be encoded and decoded by means of the technology described herein, including but not limited to photos, game type textures, text, drawings, high dynamic range images and textures, etc.

The technology described herein is a high quality compression/decompression scheme that can be used for compressing and decompressing images in applications where a high quality is required. For example, images in the form of icons and other small graphical symbols, which usually are very colorful and has high contrast, require a high quality compression/decompression scheme for providing a satisfactory visual result of the image processing. Furthermore, applications, such as games on personal computers and game consoles, put high quality demands on the compression/decompression scheme employed for processing such images. The technology described herein is in particular suitable for handling these types of images and can compress them and subsequently decompress them without any unacceptable loss of image quality.

Briefly, the technology described herein achieves this high image quality by representing the "true" original colors of the images elements in an image block with colors lying or located on a surface in color space. This means that image elements of an image block compressed and subsequently decompressed are assigned colors of color representations in the color surface. This should be compared to the top quality schemes of today, S3TC/DXT and iPACKMAN/ETC, where the colors used for representing the colors of image elements in an image block are limited to a line in color space. Therefore, by having access to color points on a surface for representing an image block instead of only color points on a line, a more accurate and correct representation of the true colors of the image elements are possible. As a consequence, a compressed and decompressed image block according to the invention will be of much higher quality than that of S3TC/DXT and iPACKMAN/ETC.

In order to illustrate the difference in quality between the technology described herein and S3TC/DXT, FIGS. 1 to 4 show different types of images compressed and subsequently decompressed using S3TC/DXT and the technology described herein. In these FIGS. 1 to 4, the original uncompressed images are in FIGS. 1A, 2A, 3A and 4A, FIGS. 1B, 2B, 3B and 4B illustrate these images processed according to S3TC/DXT, whereas FIGS. 1C, 2C, 3C and 4C are images processed according to the technology described herein. It is first evident from the figures denoted by B and in particular FIGS. 1B and 2B that the degradation in quality from the S3TC compression affects the intelligibility of the images quite a bit. This is probably due to the fact that such icons in general are already made as small as possible, on the limit of what can be discernable. Adding a regular prior art compression on top of that pushes them over the limit of acceptable visual appearance. For example, when comparing FIGS. 1A and 1B one notices how the picture in the book deteriorates and how the nice shadows under it are marred by banding artifacts. A similar deterioration of the shadow under the icon due to coding artifacts is evident when comparing FIGS. 2A and 2B. These small icon images are compressed at a much higher quality, which can be seen by comparing FIGS. 1B and 1C, and 2B and 2C. The difference in quality between S3TC and the technology described herein for these icon images is actually 7.1 dB (albeit of different bit rate), which is a huge improvement within the field of image processing. Normally, differences of 0.5 dB are clearly visible to an onlooker so the technology described herein provides a major visual improvement compared to the prior art schemes.

The technology described herein also beats S3TC in terms of quality for other types of images, see FIGS. 3B, 3C and 4B, 4C. When a test set of 16 images, including the images illustrated in FIGS. 1A, 2A, 3A and 4A, where compressed according to S3TC and an example embodiment, the difference in image quality was 5.5 dB, to the advantage of the technology described herein.

Compression

Figure 6:
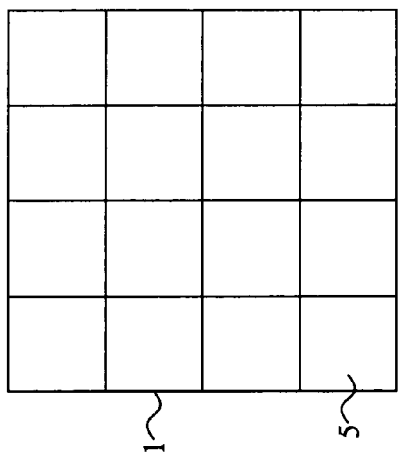
FIG. 6 is an illustration of an example of an image block.
Figure 5:
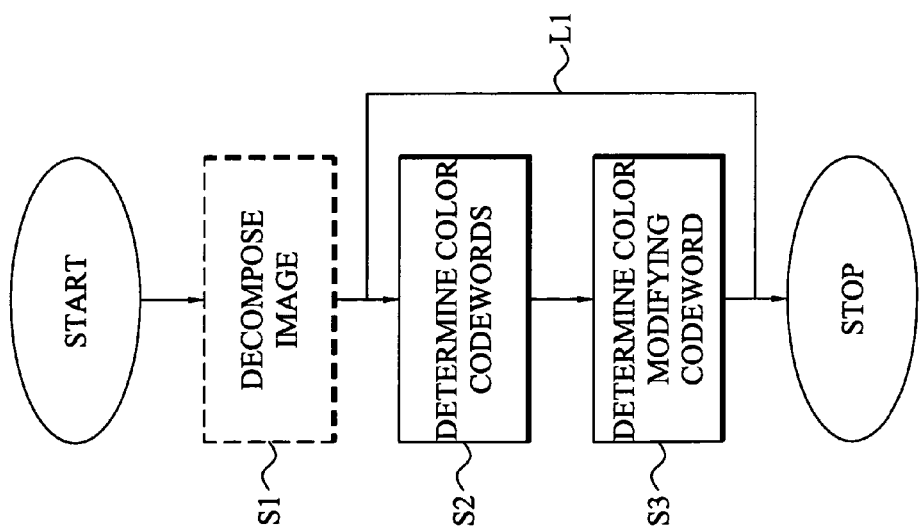
FIG. 5 is a flow diagram of a method of compressing an image and an image block.

FIG. 5 illustrates a (lossy) method of encoding an image. In a first step S1, the image is decomposed or divided into a number of image blocks. Each such image block then comprises multiple image elements. In a preferred embodiment of the invention, an image block comprises sixteen image elements (pixels, texels or voxels) and has a size of $2^m \times 2^n$ image elements, where m=4−n and n=0, 1, 2, 3, 4. More preferably, m and n are both 2. It could also be possible to utilize an image block of size $2^m \times 2^n$ or $2^m \times 2^n \times 2^p$ image elements, where m, n, p are zero or positive integers with the proviso that not all of m, n, p may simultaneously be zero. FIG. 6 schematically illustrates an example of an image block 1 with sixteen image elements 5. In an alternative example embodiment, the image is decomposed into a number of image sub-blocks, preferably having a size of 2×4 or 4×2 image elements. In such a case, two such sub-blocks could be handled together during compression to form a 4×4 block 1 as illustrated in FIG. 6 and which is used for iPACKMAN/ETC. Returning to FIG. 5, the whole image block is preferably decomposed into (non-overlapping) image blocks in step S1. However, in some applications, only a portion of an image is encoded and, thus, only this portion is decomposed into image blocks.

The following steps S2 and S3 perform an encoding or compression of the image blocks. Firstly, in step S2, at least a first and a second color codeword are determined for an image block. These color codeword are representations of and define multiple, i.e. at least two, discrete color representations or values along a line in a color space. The color representations could be RGB (Red, Green, Blue) colors, colors in the YUV space or YCrCb space, or any other proprietary color space used in image and graphics processing and management. Note that at least one of these multiple color representations can have at least one negative color component value or a color component value exceeding a pre-defined maximum color component value, e.g. 255.

The color codewords are preferably in the same color format (space) as the image. However, in some cases, it may be useful to convert the image to a different color space, i.e. having the color codewords in a first color space and the original image in a second different color space.

The line in color space along which the multiple color representations are present has a direction vector in color space. In a preferred example implementation of the technology described herein, the two color codewords represent four discrete color representations situated along the line. In another preferred implementation, the two color codewords represents eight discrete color representations along the line.

In a next step S3, a color modifying codeword is determined for the image block. This modifying codeword represents a set of multiple color modifiers that are used (during decoding) for modifying the discrete color representations represented by the color codewords. These multiple color modifiers, thus, are used for modifying the color representations along at least one selected extension vector in color space. This at least one selected extension vector is furthermore different from the direction vector described above. By modifying one of the multiple discrete color representations with the modifiers along an extension vector, a set of multiple color points or values are obtained. In a preferred implementation, this obtained point set comprises four or eight color points. This means that modifying each of M discrete color representations with N color modifiers results in M different sets of N color points, where M, N are equal to or larger than two and preferable are equal to four or eight. The M×N color points of the sets are located on a surface in color space. This surface is furthermore defined based on the multiple color representations and the at least one extension vector. Alternatively, especially when the color points are present on a plane in color space, the direction vector, the at least one selected extension vector and at least one of the color representations uniquely define the plane. The colors of the image elements in the block are then approximated by color points selected out of the M×N color points on the surface.

In a preferred example embodiment, the M×N color points of the sets will collectively form a grid on the surface in color space. In such a case, the grid can be equispaced (regular) or non-equispaced (irregular). The grid can in turn lie on a surface or plane in color space.

In an alternative embodiment, the multiple color points can form another regular or irregular pattern on the surface besides a grid. For example, the color points can be located in different circular or elliptic orbits around a central point on a surface or a plane in color space. The points can have a density according to a general Gaussian distribution. This means that the density of color points are higher closer to the central point as compared to further from the central point on the surface.

Having access to multiple color points present on a surface instead of being limited to multiple color points along a line in color space (as S3TC/DXT and iPACKMAN/ETC) allows a much more accurate representation or approximation of the colors of the image elements in the block. This higher degree of freedom in selecting color values on a surface as compared to a line is a cause of the increase in quality obtainable by the technology described herein.

Furthermore, not all multiple color points need to be assignable to the image elements in the image block as long as the assignable color points are located on a surface and not a line in color space.

It is anticipated that the operations disclosed by steps S2 and S3 can be performed sequentially as is illustrated in the figure. However, in most practical implementations, the process of determining color codewords and color modifying codeword is a single collective process that typically involves determination of the codewords, calculation of error values and selecting codewords that minimize the error values.

The steps S2 and S3 are preferably repeated for all image blocks provided during the decomposing of step S1 (schematically illustrated by line L1). The result is then a sequence or file of encoded image blocks. The encoded image blocks (encoded representations of the image blocks) could be ordered in a file from left to right and top to bottom in the same order in which they were broken down in the block decomposing of step S1. The method then ends.

The encoded image could be provided to a memory for storage therein until a subsequent rendering, e.g. display, of the image. Furthermore, the encoded image could be provided as a signal of encoded block representations to a transmitter for (wireless or wired) transmission to another unit.

Figure 7:
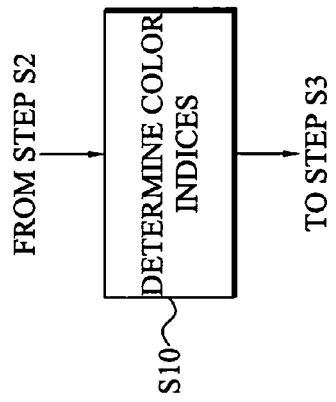
FIG. 7 is a flow diagram of an additional step of the compressing method of FIG. 5.

FIG. 7 is a flow diagram of an additional step of the encoding method of FIG. 5. The method continues from step S2 in FIG. 5. In a next step S10, multiple color indices or representations are determined for the current processed image block. Each such color index is associated with and identifies one of the multiple discrete color representations defined by the first and second color codewords. In other words, a color index allows identification of which color representation along the line in color space to use for a specific image element of the block.

In the case of four discrete color representations, the color index could be a 2-bit sequence identifying one of these four values. If eight different color representations are possible, the color index is preferably a 3-bit sequence. Step S10 is preferably repeated for all image elements in the image block.

As was noted above, a respective color index is preferably determined in step S10 for each image element in the block. However, in other embodiments, it could be possible to only determine color indices for a subset of the image elements in the block. The remaining image element(s) then preferably has (have) a predefined association with one of the discrete color values and therefore does (do) not need an explicit color index.

The method then continues to step S3 of FIG. 5 where the color modifying codeword is determined.

Figure 8:
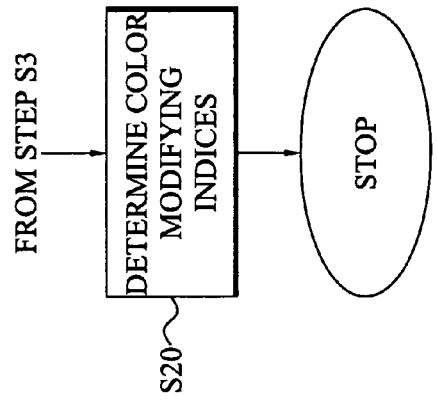
FIG. 8 is a flow diagram of an additional step of the compressing method of FIG. 5.

FIG. 8 is a flow diagram of an additional step of the encoding method of FIG. 5. The method continues from step S3 in FIG. 5. In a next step S20, multiple color modifying indices or representations are determined.

Each of these color modifying indices is associated with and identifies one color modifier value from the color modifier set represented by the color modifying codeword. Thus, the color modifying index allows identification of which color modifier of the set to use for a specific image element of the block.

In the case of a color modifier set comprising eight modifier values, the color modifier index is preferably a 3-bit sequence. Correspondingly, with a set of four modifier values a 2-bit index is adequate. For both the color modifier indices and the color indices described above, if more than eight color values or color modifiers are used, then more than three bits are required for each image element to identify the correct index.

Step S20 is preferably repeated for all image elements in the image block. Alternatively, step 20 is performed for a subset of the image elements in the block, where the remaining image element(s) has (have) a predefined association with a color modifier and does (do) not require any color modifier index.

The procedure collectively illustrated by steps S2, S3 of FIG. 5, step S10 of FIG. 7 and step S20 of FIG. 8 can be performed in a single compression step, implying that the codewords and indices are determined together and typically simultaneously. In this procedure, error values are preferably calculated for the different possible codewords and indices and the combination of codewords and indices that results in a smallest error value when compared to the original colors of the image elements in the block is selected as compressed representation of the image block.

The method then ends.

FIG. 9 illustrates a compressed representation 10 of an image block that has been compressed according to a first example embodiment. The representation 10 (encoded or compressed image block) comprises the first color codeword 11, the second color codeword 12, a sequence or bitmap 13 of color indices 13A, a color modifying codeword 14 and a sequence or bitmap 15 of color modifying indices 15A. Note that the mutual order of the codewords 11, 12, 14, and index sequences 13, 15 of the encoded image block 10 may differ from what is illustrated in the figure.

In this embodiment each of the color codewords 11, 12 comprises multiple, preferably three, color components 11A, 11B, 11C; 12A, 12B, 12C. For example, a red color component 11A, 12A, a green component 11B, 12B and a blue component 11C, 12C are present in the respective color codeword 11, 12. In a preferred implementation, the two codewords 11, 12 are RGB565, implying that the red 11A, 12A and blue 11C, 12C components comprise 5 bits each and the green components 11B, 12B comprise 6 bits. More bits can, as illustrated above, be spent on the green components 11B, 12B since the green component gives a disproportionate contribution to the perception of intensity.

Four color representations, CV0, CV1, CV2, CV3, can then be calculated as linear combinations of these two color codewords 11, 12 according to below:

CV0=first codeword, i.e. $R_0, G_0, B_0$

CV1=second codeword, i.e. $R_1, G_1, B_1$ $CV2 = \frac{2}{3}CV0 + \frac{1}{3}CV1$, i.e. $\frac{1}{3}(2R_0 + R_1, 2G_0 + G_1, 2B_0 + B_1)$ $CV3 = \frac{1}{3}CV0 + \frac{2}{3}CV1$, i.e. $\frac{1}{3}(R_0 + 2R_1, G_0 + 2G_1, B_0 + 2B_1)$ In an alternative implementation CV2 and CV3 are calculated as follows:

$CV2 = \frac{5}{8}CV0 + \frac{3}{8}CV1$ $CV3 = \frac{3}{8}CV0 + \frac{5}{8}CV1$

As the color representations are linear combinations of the two color codewords 11, 12 they will all lie on a line in color space having the following equation:

$R = R_0 + (R_1 - R_0)t$ $G = G_0 + (G_1 - G_0)t$ where $t \in [-\infty, \infty]$ $B = B_0 + (B_1 - B_0)t$ and the following direction vector $v = [R_1 - R_0, G_1 - G_0, B_1 - B_0]$.

The color index sequence 13 preferably comprises 16 2-bit color indices 13A, i.e. one color index 13A per image element in the image block of FIG. 6. These color indices 13A can then have one of the following values; $00_{bin}$, $01_{bin}$, $10_{bin}$, $11_{bin}$, where each of the values is associated with one of CV0 to CV3.

The color modifier codeword 14 of FIG. 9 comprises a representation 14A of a minimum color or intensity modifier value $I_{MIN}$ and a representation 14B of a maximum intensity modifier value $I_{MAX}$. Eight different intensity/color modifier values $I_0$ to $I_7$ of the modifier set can then be calculated as linear combinations of $I_{MIN}$ and $I_{MAX}$. For example:

$I_0 = I_{MIN}$ $I_1 = I_{MAX}$ $I_2 = \frac{1}{7}(6I_{MIN} + I_{MAX})$ or $\frac{1}{5}(4I_{MIN} + I_{MAX})$ $I_3 = \frac{1}{7}(5I_{MIN} + 2I_{MAX})$ or $\frac{1}{5}(3I_{MIN} + 2I_{MAX})$ $I_4 = \frac{1}{7}(4I_{MIN} + 3I_{MAX})$ or $\frac{1}{5}(2I_{MIN} + 3I_{MAX})$ $I_5 = \frac{1}{7}(3I_{MIN} + 4I_{MAX})$ or $\frac{1}{5}(I_{MIN} + 4I_{MAX})$ $I_6 = \frac{1}{7}(2I_{MIN} + 5I_{MAX})$ or $0$ $I_7 = \frac{1}{7}(I_{MIN} + 6I_{MAX})$ or $255$ where 0 represents a minimum representable color value and 255 represents a maximum representable color value. Note that the maximum and/or minimum modifier value does not necessarily have to be used as color modifier value according to the invention. In such a case, only values calculated therefrom are instead utilized as modifiers.

The color or intensity modifier index sequence 15 preferably comprises 16 3-bit color modifier or intensity indices 15A, i.e. one intensity index 15A per image element in the image block of FIG. 6. These intensity indices 15A can then have a value from $000_{bin}$ to $111_{bin}$.

In this embodiment, a selected color modifier value is added to each color component of a selected color representation to obtain a color value representation of an image element. This means that in this case the multiple color modifiers are employable for modifying the multiple discrete color representations along the luminance vector $i=[1,1,1]$. By having access to four different color values CV0 to CV3 and eight possible intensity modifiers $I_0$ to $I_7$, 32 different color points can be represented by the encoded compressed block 10. Table I below lists these 32 different possible color values.

TABLE I

|  | $I_0$ | $I_1$ | $I_2$ | $I_3$ | $I_4$ | $I_5$ | $I_6$ | $I_7$ |
|---|---|---|---|---|---|---|---|---|
| CV0 | CV0 + $I_0$ | CV0 + $I_1$ | CV0 + $I_2$ | CV0 + $I_3$ | CV0 + $I_4$ | CV0 + $I_5$ | CV0 + $I_6$ | CV0 + $I_7$ |
| CV1 | CV1 + $I_0$ | CV1 + $I_1$ | CV1 + $I_2$ | CV1 + $I_3$ | CV1 + $I_4$ | CV1 + $I_5$ | CV1 + $I_6$ | CV1 + $I_7$ |
| CV2 | CV2 + $I_0$ | CV2 + $I_1$ | CV2 + $I_2$ | CV2 + $I_3$ | CV2 + $I_4$ | CV2 + $I_5$ | CV2 + $I_6$ | CV2 + $I_7$ |
| CV3 | CV3 + $I_0$ | CV3 + $I_1$ | CV3 + $I_2$ | CV3 + $I_3$ | CV3 + $I_4$ | CV3 + $I_5$ | CV3 + $I_6$ | CV3 + $I_7$ |

These 32 color points collectively form a grid on a surface in color space, where this surface is uniquely defined by the two vectors v and i and one of the four color representations.

The selected color modifier is, thus, preferably added to each of the color components in the color representation for an image element. In such a case, a modifier value of 128 could mean 0, i.e. no change in color value, a modifier value of 0 could represent −128, i.e. maximum subtraction, whereas a modifier value of 255 is +127, i.e. maximum addition. In a preferred implementation, minimum and maximum color thresholds are employed for the final modified color values. For example, a minimum and a maximum value of 0 and 255, respectively, can be used for the case with 256 different colors. Corresponding thresholds for 1024 colors could be 0 and 1023. In such a case, the resulting color component values (R', G', B') for the image elements can be calculated as:

$R' = \text{clamp}(0, R_n + I_x - 128, 255)$ $G' = \text{clamp}(0, G_n + I_x - 128, 255)$ $B' = \text{clamp}(0, B_n + I_x - 128, 255)$ where preferably n=0-3 and x=0-7.

This calculation can be performed by a pixel shader (fragment shader) and therefore it is possible to implement this invention on today's hardware in e.g. PCs graphics cards. Note that if the values are not clamped, the values $R_n$, $G_n$, $B_n$ and $I_x$ can be bilinearly interpolated before or after this operation, whatever is more convenient, since both operations are linear. Thus determination of color codewords according to the invention can typically be performed using the existing hardware or slight modifications thereof in today's graphics cards. The pixel shader can then be used for calculating the color modifying codeword of the invention. This means that for certain applications, the pixel shader can sometimes be omitted. However, in such a case the color representations used for representing the true colors of the image elements in a block are limited to a line in color space as the prior art schemes. But in such a comparatively low-quality applications, the image block can be processed according to the prior art S3TC/DXT scheme. Thus, if a game is created for two different user machines, where some may not be able to run the pixel shader fast enough, the same data can be used for both user terminals. Then higher quality will only be possible on the terminal that runs the pixel shader but both terminals will get reasonable output.

As is evident from the discussion above, the total size of the encoded representation 10 of the image block is preferably 128 bits resulting in a compression rate of 8 bits per pixel (bpp).

Figure 10:
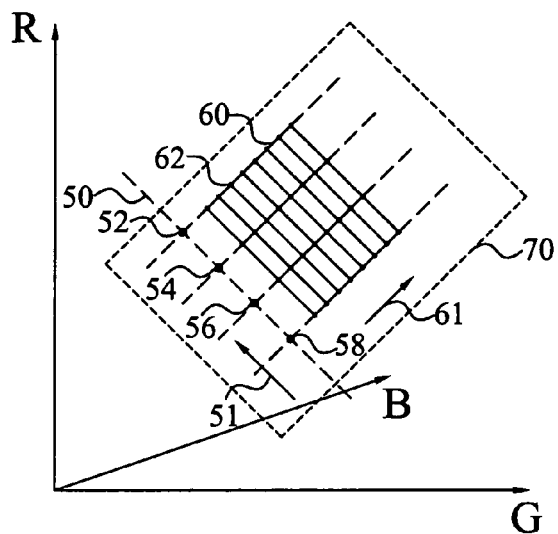
FIG. 10 is a diagram illustrating a grid of multiple color points on a plane in a color space, which points can be used for representing the colors of an image block.

FIG. 10 is a diagram of a portion of the RGB color space illustrating a grid 60 of color points 62. The figure clearly illustrates the multiple color representations 52, 54, 56, 58 defined by the first and second color codeword. These color representations 52, 54, 56, 58 are all present on a line 50 in the RGB space, which line 50 further has a direction vector 51.

The color points 62 usable as color value representations of the image elements in the image block are obtained by modifying the respective color representations 52, 54, 56, 58 with color modifiers represented by the color modifier codeword along an extension vector 61. In FIG. 10, the two color codewords define four different color representations 52, 54, 56, 58 and the color modifier codeword represents a set of eight different color modifiers. This means that by modifying each of the color representations 52, 54, 56, 58 with modifiers from the set, eight possible color points 62 are obtained per color representation 52, 54, 56, 58. These in total 32 color points 52 form the grid 60 on a plane 70 in the RGB space.

In a typical preferred example implementation, the color points 62 of the grid 60 are obtained by adding the color modifiers to the color representations 52, 54, 56, 58 along a direction defined by the extension vector 61. As a consequence, the color points 62 and the grid 60 will be present on the plane 70 uniquely defined by the color representations 52, 54, 56, 58 and the extension vector or by the direction vector 51 of the line 50, the extension vector 61 and a point on the plane 70. This point can be any of the color representations 52, 54, 56, 58 and/or a color point 62 of the grid 60.

If a color modification procedure as illustrated by Table I is employed, i.e. adding a selected color modifier to each color component of a selected color representation, i.e. $R_n+I_x$, $G_n+I_x$, $B_n+I_x$, where n=0-3 and x=0-7, the extension vector 61 is actually the luminance vector in the RGB space, i.e. i=[1,1,1].

Figure 11:
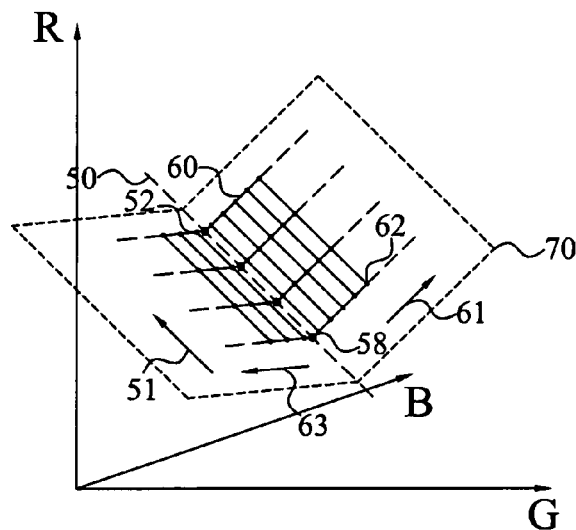
FIG. 11 is a diagram illustrating a grid of multiple color points on a surface in a color space, which points can be used for representing the colors of an image block.

FIG. 11 is another diagram illustrating a grid 60 of color points 62 in the RGB color space. Compared to FIG. 10, two different extension vectors 61, 63 are employed for modifying the color representations 52, 58. This means that some of the resulting color points 62 after the color modification are present in color space along the direction of the first extension vector 61, whereas the remaining color points 62 are present along the direction of the second extension vector 63. As a result, which is evident from the figure, the surface 70 becomes a folded plane and the grid 61 becomes a folded grid. Please also note that the color representations 52, 58 can, depending on the particular color modifier values employed, constitute color points 62 of the grid 60.

In FIG. 11, the surface 70 is defined by the extension vectors 61, 63, the direction vector 51 and e.g. one of the color representations 52, 58.

Figure 12:
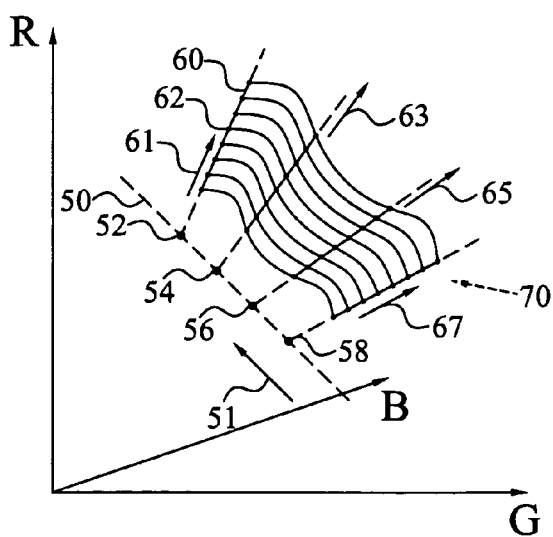
FIG. 12 is a diagram illustrating another grid of multiple color points on a surface in a color space, which points can be used for representing the colors of an image block.

In FIGS. 10 and 11, the grid 60 formed by the color points 62 is present on a plane in color space. However, the technology described herein is not limited thereto. Generally, the color points 62 are all present on a planar or non-planar surface 70 in color space defined by the multiple color points 52, 58 and the at least one extension vector 61, 63. A plane is then regarded as a special case of such a surface. FIG. 12 illustrates this situation, where the color points 62 and the grind 60 are present on a general non-planar surface 70 in the RGB space.

Similar to FIGS. 10 and 11, the color representations 52, 54, 56, 58 are all present on a line 50 having a selected direction vector 51. Each such color representation 52, 54, 56, 58 is then modified by the color modifiers defined by the color modifier codeword along an extension vector 61, 63, 65, 67. In this example, each color representation 52, 54, 56, 58 has an associated unique extension vector 61, 63, 65, 67. Thus, if the color codewords define M color representations 52, 54, 56, 58, 1 to 2×M extension vectors 61, 63, 65, 67 can be used for modifying the representations 52, 54, 56, 58.

In this case, the surface is defined by the color representations 52, 54, 56, 58 and the extension vectors 61, 63, 65, 67.

Thus, the grid 60 of color points 62 does not necessary have to be a regular planar grid 60 but can have any shape dependent on the surface 70 on which it is lying in the RGB space. Furthermore, as was mentioned in the foregoing, the multiple color points located on the surface do not necessarily have form a grid or any pattern at all as long as they lie on a surface and not solely on a line in color space. For example, the color points can form an equispaced or non-equispaced grid, a pattern formed by two displaced grids, a pattern formed by orbits, etc. on a surface in color space.

Figure 13:
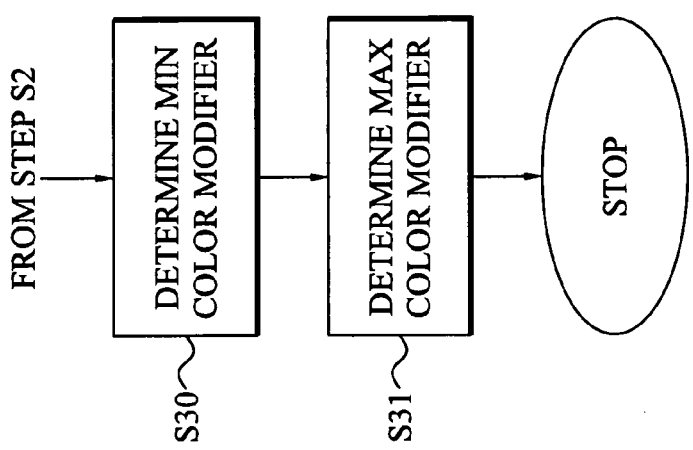
FIG. 13 is a flow diagram illustrating an embodiment of the step of determining color modifying codeword in FIG. 5.

FIG. 13 is a flow diagram illustrating an embodiment of the step of determining a color modifying codeword in FIG. 5. The method continues from step S2 in FIG. 5. In a next step S30, a minimum color modifier ($I_{MIN}$) is determined. This minimum modifier represents the smallest modifier value that can be used for modifying color representations and obtaining color points. Correspondingly, in step S31 a maximum color modifier ($I_{MAX}$) is determined. The maximum modifier is the largest modifier value that can be used for modifying the color representations. The multiple color modifiers of the modifier set can then be calculated as linear combinations of the minimum and maximum modifier. Note that for some image blocks, the minimum and maximum modifier values are not employed but merely linear combinations thereof.

In a first embodiment, this modifier set only comprises the minimum and maximum modifier so no other color modifiers can be calculated. In preferred embodiments, other color modifiers are calculated as linear combinations of these two extreme value modifiers so that $I_{MIN} < I_j < \ldots < I_{j+k} < I_{MAX}$. The method then ends.

In another embodiment of the step of determining a color modifying codeword, the color modifying codeword is a table index allowing identification of a color modifier set. This table index could then identify or point to the set in a table or codebook comprising several different color modifier sets. Each set comprises two or more color modifier values, preferably at least four modifier values. In addition, the modifier values of a set are preferably mathematically complementary values, i.e. each set is preferably symmetrical. For example, a possible intensity modifier set could be [−a, −b, −c, −d, d, c, b, a], where a, b, c and d are positive integers and a>b>c>d. In a preferred implementation, the color modifying codeword also represent, in addition to the table index, an average or starting intensity modifier value $I_{mean}$. This means that if a color representation of an image element is R,G,B and an intensity modifier value of −b should be used for that image element, the resulting color point after intensity modification becomes R−b+$I_{mean}$, G−b+$I_{mean}$, B−b+$I_{mean}$. Alternatively, instead of utilizing a representation of a starting intensity value, preferably an average intensity value, an intensity table that incorporates this functionality could be employed.

The table preferably comprises sets including small color modifier values and sets that include large intensity modifier values.

The actual color modifier values of the sets in the table can be found by starting with random values and then optimizing these values using a number of different optimization schemes and algorithms, such as versions of the LBG-algorithm (Linde, Buzo and Gray), simulated annealing and coordinate search, which are known to a person skilled in the art. A handful of images of different types e.g. photos, game type textures, text, etc., can be used as training data.

In order to make a hardware implementation of the intensity table less expensive, the color modifiers of a set can be forced to be symmetrical, as was discussed above, and/or the color modifiers of a given set could be a copy of color modifiers of another set modified by a factor, e.g. two.

If the intensity table comprises at most 16 different color modifier sets, the color modifying codeword is preferably a 4-bit index ($0000_{bin}$-$1111_{bin}$) identifying one of the (16) sets.

However, for more or less than 16 sets in a table, the size of the color modifying codeword might have to be changed. For example, if the table comprises two (3-4, 5-8 or more than 16) intensity modifier sets, the codeword size could be limited to one bit (two bits, three bits or more than four bits). In addition, the number of color modifier values per set could differ from four, for example, five, six, seven or preferably eight different modifiers per set.

Figure 14:
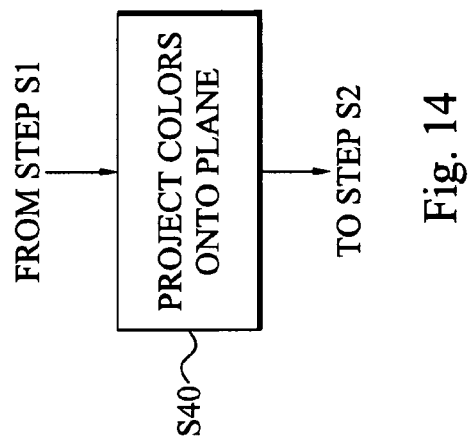
FIG. 14 is a flow diagram of an additional step of the compressing method of FIG. 5.

FIG. 14 is a flow diagram of an additional step of the compression method of FIG. 5. The method continues from step S1 in FIG. 5. With reference to FIG. 9, there are two ways of modifying the luminance of the colors of the image elements in the block. The first is the color codewords 11, 12 and the second is the color (intensity/luminance) modifying codeword 14. Having two ways of specifying the same parameter is wasteful. Therefore, in an alternative embodiment of the invention, all intensity information of an image block is first removed before compressing the image block. This can be done by projecting the (RGB) colors in the original image block so that they have constant intensity. A preferred procedure is illustrated by step S40 in FIG. 14. In this step S40, colors of the image elements in the block to be compressed or all colors of an image is projected to a plane in color space. A preferred such plane is the plane R+G+B−384=0. This is the plane that goes through the grey point (128, 128, 128) and has normal (vector perpendicular to the plane) [1,1,1], i.e. completely orthogonal to the luminance direction.

A pseudocode for this color projection can according to:

$$diff = [R\ G\ B] - [128\ 128\ 128];$$

$$proj\_on\_normal = \frac{diff * \begin{bmatrix} 1 \\ 1 \\ 1 \end{bmatrix}}{[1\ 1\ 1] * \begin{bmatrix} 1 \\ 1 \\ 1 \end{bmatrix}} * [1\ 1\ 1];$$

proj_in_plane=diff−proj_on_normal;

projected_point=[128 128 128]+proj_in_plane;

where R, G, B is the original colors of an image element.

By projecting the colors in this way, the bits used for representing the color codewords can be used more efficiently to specify the chrominance. This means that the overall quality will increase. In test experiments performed, the Peak Signal/Noise Ratio (PSNR) scores doubled when using this color projection as compared to not employing any projection.

The method then continues to step S2 of FIG. 5. Note that the selection of projecting the original colors can be made on a block basis, i.e. projecting the colors of some image blocks but not others. An even finer grade of projection selection is possible if the selection of whether to project a color is made on an image element basis or per sub-set of multiple image elements of an image block. This means that some of the colors of the image elements in the block are projected, whereas others are not. This technique can be extended even further. In that case, the starting color for compressing an image element can be any linear combination from the original pixel color to the projected color. Thus, in such a case, any color between the original color value and the projected color value could be used in compressing an image element.

Figure 15:
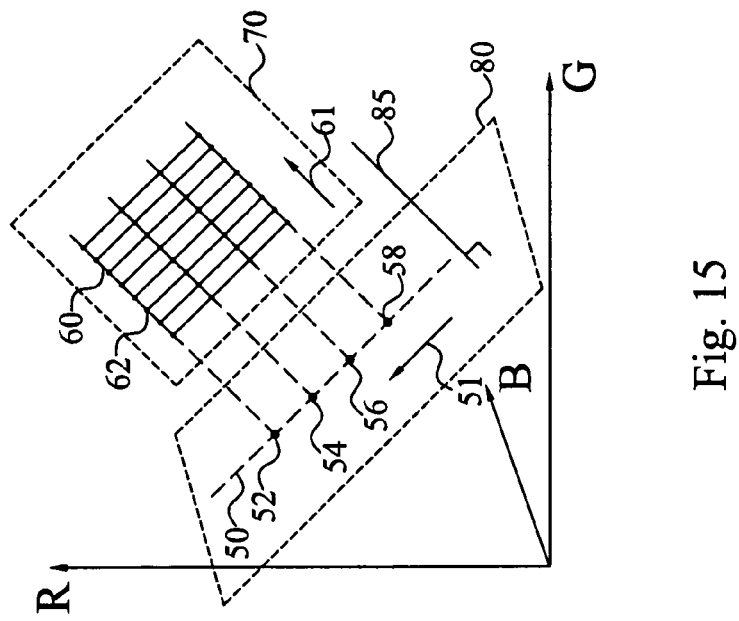
FIG. 15 is a diagram illustrating another grid of multiple color points on a plane in a color space, which points can be used for representing the colors of an image block.

FIG. 15 is a diagram illustrating a portion of color space for an example embodiment employing color projection. In this figure, the plane 80 goes through the grey point (128, 128, 128) has normal 85 that is parallel with the luminance vector [1,1,1]. The colors of the image elements in a block to be compressed are projected down to this plane 80. This means that the color representations 52, 54, 56, 58 defined by the color codewords will all be present on the plane 80. Furthermore, the line 50 will be in this plane 80. The color points 62 of the grid 60 on the surface/plane 70 are then determined as previously described.

The projection of colors can seemingly give rise to problems with some colors. In order to specify black, for instance, the correct representation should be (128, 128, 128) (perfect grey) by the color codewords and using a color modifier of −128. However, if the codewords are in the form of RGB565, the color (128, 128, 128) is not reachable and the closest color is (129, 128, 129). This means that black will be represented as a color point of (1, 0, 1) instead of (0, 0, 0), which is unfortunate.

Another problematic color is extreme colors such as (255, 0, 0) (red) or (255, 255, 0) (yellow), which if projected to the plane R+G+B−384=0 becomes (298, 43, 43) and (213, 213, −42), which are not representable if an allowed color rage of [0, 255] is employed.

The above mentioned problems can simply be circumvented by not projecting the colors of an image block that contains an image element having a problematic color. Such an image block can then be compressed at a high quality without any color projection. Alternatively, only image elements with problematic colors are not projected, whereas a color projection is performed for the other image elements in the block. In a further alternative, a linear combination of the original color and projected color is employed for problematic colors.

If a color projection procedure is performed, the color representations defined by the two color codewords lay in the plane R+G+B−384=0. In such a case, each color codeword could then instead represent two color components, for example R and G. The final color component B is calculated from the two components R and G and the plane equation B=384−R−G. This means that in such a case a RGB565 color codeword can be replaced by a RG88 codeword. This will further enhance the quality. In addition, by extending the color interval to also include colors such as (298, 43, 43), it is possible to represent even extreme colors, which means that is not necessary to avoid projection for certain blocks.

FIG. 16 illustrates a compressed representation 20 of an image block that has been compressed according to a second example embodiment. The representation 20 (encoded or compressed image block) comprises the first color codeword 21, the second color codeword 22, a sequence or bitmap 23 of color indices 23A, a color modifying codeword 24 and a sequence or bitmap 25 of color modifying indices 25A. In addition, this compressed block representation 20 may comprise a flipbit 26 that defines whether two sub-blocks of the image block are two 2×4 block or two 4×2 blocks, i.e. placed vertically flipbit=$0_{bin}$ or horizontally flipbit=$1_{bin}$, or vice versa. Optionally, a diffbit 27 may be present in the compressed block 20 and used for selecting between two compression modes, non-differential as in FIG. 16 or differential as in FIG. 17. Note that the mutual order of the codewords 21, 22, 24, index sequences 23, 25, flipbit 26 and diffbit 27 of the encoded image block 20 may differ from what is illustrated in the figure.

In this embodiment, the first color codeword 21 comprises, for each of the two sub-blocks, a red color component 21A, 21B, a blue component 21E, 21F and a green component 21C, 21D that is not employed or set to a default value, e.g. zero. Thus, for the image elements in the first sub-block the first color codeword is $R_0B_0$ and for the second sub-block $R_1ized0B_1$. Preferably four bits are employed for each of these color components 21A to 21F. Alternatively, instead of wasting the bits for the green components 21C, 21D, these bits can instead be used for improving the accuracy of the red 21A, 21B and blue 21E, 21F components. In such a case, the first codeword 21 could be $R_0B_066$ and $R_1B_166$.

In this embodiment, the second color codeword 22 is used for specifying the green component of the color representations. This means that more bits can be spent on the green component. This is advantageous since green is the most important color component for the human visual system. The second codeword 22 can therefore comprise a minimum green value 22A and a maximum green value 22B. Possible green components are calculated as linear combinations of the minimum 22A and maximum 22B value. The same linear calculations as was presented above for the color modifying codeword in connection with FIG. 9 can be used for the green color components of the second color codeword 22. Preferably, eight different green component values are obtained.

The color index sequence 23 preferably comprises 16 3-bit color indices 23A, i.e. one color index 23A per image element in the image block of FIG. 6. These color indices 23A have one of the following values $000_{bin}$ to $111_{bin}$, where each of the values is associated with one of the eight green components definable by the second color codeword 22. As a consequence, image elements in the first sub-block have access to any of the color representations $R_0G_xB_0$ and the image elements in the second sub-block can use $R_1G_xB_1$, where x=0-7 and is selected, for each image element, based on the color index 23A.

The color modifying codeword 24 preferably comprises, in this embodiment, two 3-bit modifier or intensity table indices 24A, 24B, i.e. one table index 24A, 24B per image sub-block. The indices 24A, 24B identify or point to a modifier set in a table or codebook comprising several different color modifier sets. Each set comprises two or more color modifier values, preferably at least four modifier values. In addition, the modifier values of a set are preferably mathematically complementary values, i.e. each set is preferably symmetrical. For example, a possible intensity modifier set could be [−a, −b, b, a], where a and b are positive integers and a>b.

The modifier table preferably comprises sets including small intensity modifier values, which are adapted for allowing representation of smoothly changing surfaces. In addition, the table preferably also comprises sets that include large intensity modifier values, which are adapted for allowing representation of sharp edges.

In order to make a hardware implementation of the modifier table less expensive, the color modifiers of a set can be forced to be symmetrical, as was discussed above, and/or the color modifiers of a given set could be a copy of intensity modifiers of another set modified by a factor, e.g. two.

Table II illustrates an example of a modifier table comprising 8 sets of color modifiers, with four modifier values in each set.

TABLE II

| Set | Codeword | Color modifier value | | | |
|---|---|---|---|---|---|
| 0 | $000_{bin}$ | −8 | −2 | 2 | 8 |
| 1 | $001_{bin}$ | −17 | −5 | 5 | 17 |
| 2 | $010_{bin}$ | −29 | −9 | 9 | 29 |
| 3 | $011_{bin}$ | −42 | −13 | 13 | 42 |
| 4 | $100_{bin}$ | −60 | −18 | 18 | 60 |
| 5 | $101_{bin}$ | −80 | −24 | 24 | 80 |
| 6 | $110_{bin}$ | −106 | −33 | 33 | 106 |
| 7 | $111_{bin}$ | −183 | −47 | 47 | 183 |

If the tensity table comprises at most 8 different color modifier set, the color modifying codeword is preferably a 3-bit index ($000_{bin}$-$111_{bin}$) identifying one of the (8) sets, e.g. [−8, −2, 2, 8] for codeword $000_{bin}$, of the table. Due to careful choice of the modifier values in the sets (symmetrical sets), the entire Table II can be reconstructed using only 16 modifier values, and the remaining 16 values could be calculated therefrom.

Each image element is preferably associated with a color modifier index 25A representing one of the color modifiers in a color modifier set selected by the table index 24A, 24B associated with the sub-block, to which the image element belongs. For example, if a color modifier set comprising four modifier values, such as −8, −2, 2, 8, the color modifier index could be a 2-bit sequence identifying one of these four values, e.g. $11_{bin}$ corresponds to −8, $10_{bin}$ corresponds to −2, $00_{bin}$ corresponds to 2 and $01_{bin}$ corresponds to 8.

In this embodiment, eight color representations are possible that all lie on a line in color space. This color line has the direction vector v=[0,1,0]. Each of these eight color representations can then be modified with preferably four color modifiers along the extension vector e=[1,0,1] in color space, i.e. by intensity-modifying the red and blue component. Since each of the two sub-blocks have respective associated red and blue components, a grid of 32 color points present on a plane defined by the direction vector, the extension vector and at least one of the color representations is obtained per sub-block.

Figure 17:
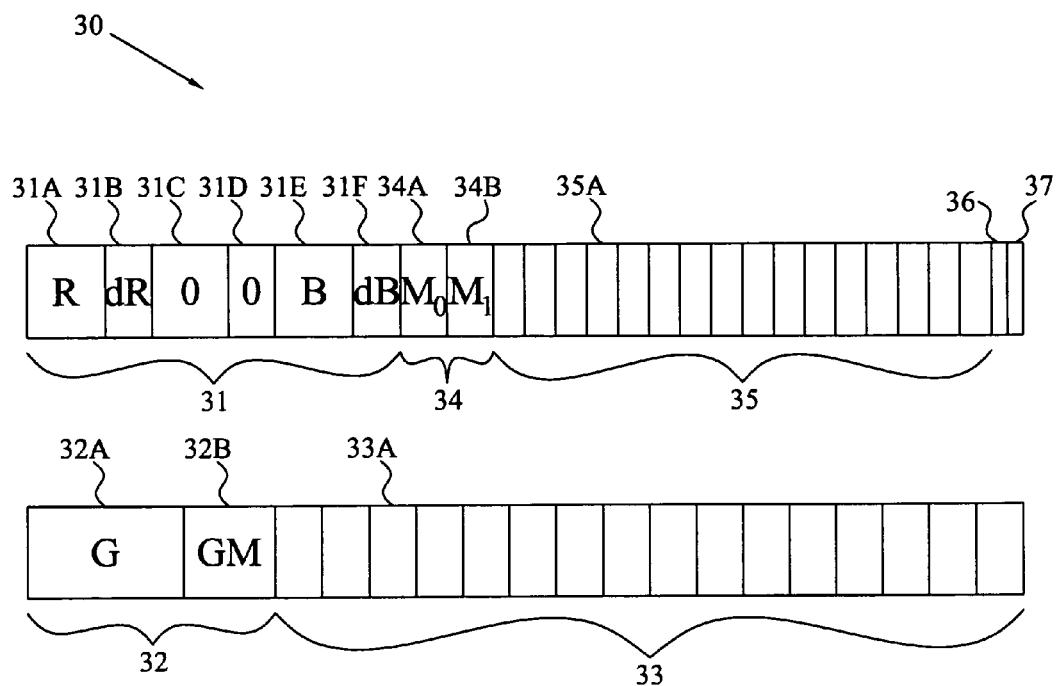
FIG. 17 is an illustration of a compressed representation of an image block according to a further embodiment.

FIG. 17 is a corresponding compressed representation 30 of an image block according to a third example embodiment. This embodiment utilizes the above-mentioned differential mode which is signaled by the diffbit 37. For more information of differential and non-differential mode, reference is made to the documents [5, 6] discussing iPACKMAN/ETC. The compressed representation 30 comprises a color codeword 31 that comprises a first color representation R, 0, B (components 31A, 31C, 31E) for the first sub-block and a second representation R+dR, 0, B+dB (components 31A-31F) for the second sub-block. In a preferred implementation the color components 31A, 31C, 31E each comprises 5 bits, whereas the differential color components 31B, 31D, 31F each comprise 3 bits. This mode is in particular useful for compressing two 2×4/4×2 neighboring sub-blocks that have rather similar color distributions.

The green components are represented by the second color codeword 32. These green components can be compressed as illustrated in FIG. 16 with a second color codeword comprising a minimum and maximum green component. However, FIG. 17 illustrates another possible implementation that can be used in this embodiment but also in the embodiment illustrated in FIG. 16.

The second color codeword 32 comprises a representation 32A of a start green value, i.e. (0,G,0). A green table index 32B is also present in the second color codeword 32 and is used for identifying a green modifier set in a green modifier table. This table of different sets of multiple green modifiers can be built on the same principles as the color modifier table described in the foregoing and illustrated by Table II. Thus, table index 32B allows identification of which of the multiple modifier sets in the table to use for the current image block. Each image element is then preferably associated with a green modifier index 33A that defines which particular green modifier of the selected modifier set to use for the image element.

The color modifying codeword 34 and the sequence 35 of color modifying indices 35A are similar to FIG. 16 and are not further described herein. Note that the mutual order of the codewords 31, 32, 34, index sequences 33, 35, flipbit 36 and diffbit 37 of the encoded image block 30 may differ from what is illustrated in the figure.

Figure 18:
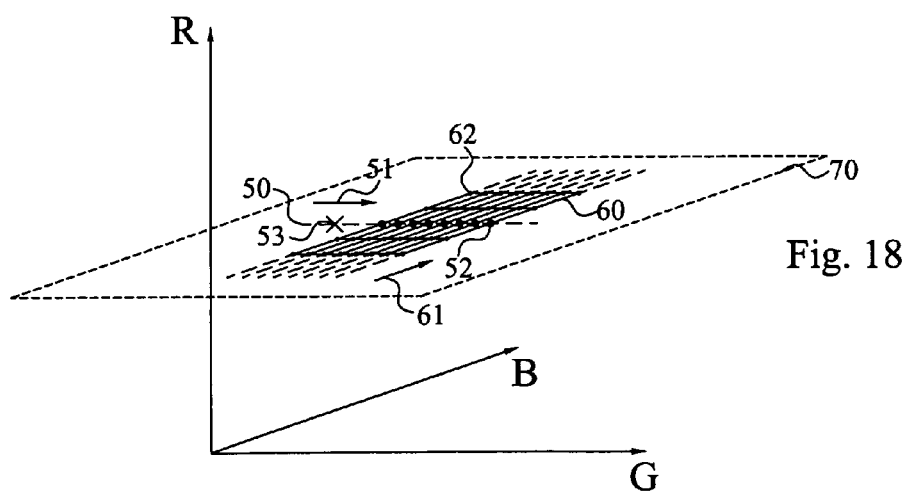
FIG. 18 is a diagram illustrating a further grid of multiple color points on a plane in a color space, which points can be used for representing the colors of an image block.

FIG. 18 is a diagram illustrating a grid 60 of color point 62 obtainable with a compressed block representation as illustrated in FIG. 17. Firstly, the start color value 53 is obtained by taking the red and blue component from the first color codeword (R or R+dR and B or B+dB) and the green component from the second color codeword (G). The multiple color representations 52 on a line 50 in color space are obtained by modifying the green component with the green modifiers provided from the modifier set defined by the second color component. These multiple color representations 52, thus, adopt the values R, G+G$_x$, B or R+dR, G+G$_x$, B+dB, where G$_x$ represents the different green component modifiers. The line 50, on which the color representations 52 are present, has a direction defined by the direction vector 51. Modifying the color representations by means of the color modifiers, results in the multiple color points 62 that collectively form the grid 60 on the plane 70.

In the embodiments illustrated in FIGS. 16 and 17, the color points are present on a plane in the RGB space. However, this plane is rather restricted for the following reasons. The R and B components move in locksteps since the color modifying codeword only affects these components. This means that the extension vector is e=[1,0,1]. Furthermore, since the G component moves independently, the direction vector is v=[0,1,0]. As a consequence, the plane in which the color points are present contains in these embodiments are defined by these two vectors and a point in the plane.

Figure 19:
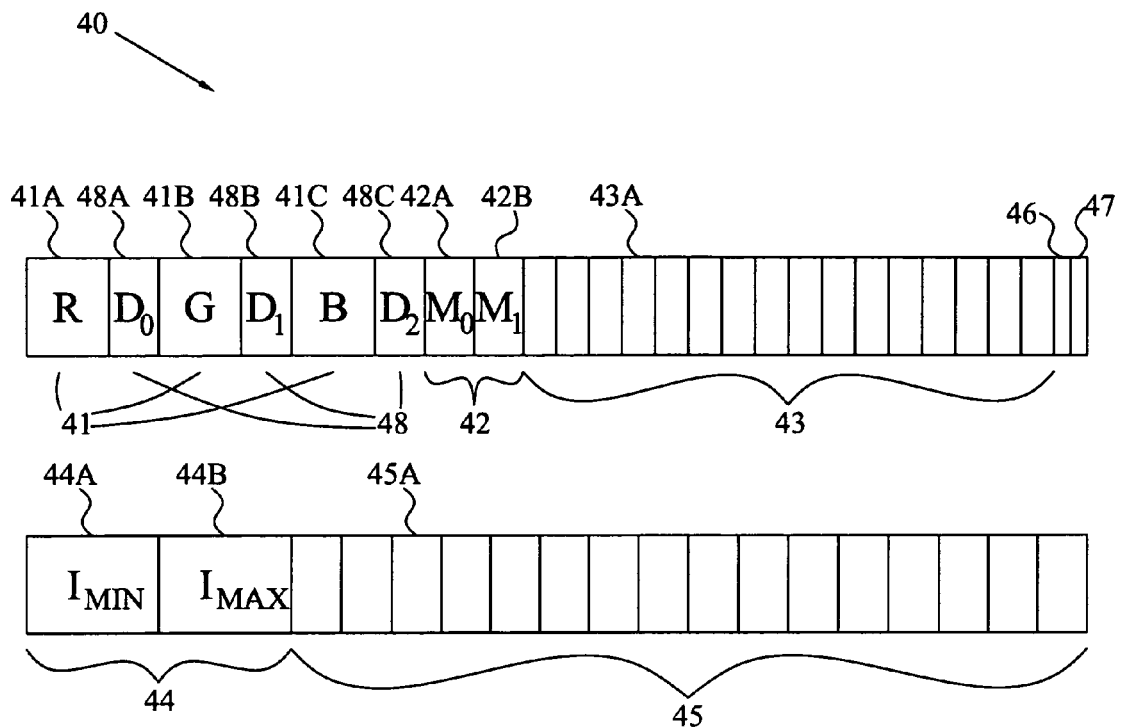
FIG. 19 is an illustration of a compressed representation of an image block according to yet another embodiment.

A possible solution to this limitation is illustrated by the compressed block representation 40 in FIG. 19. This compressed block 40 comprises a first color codeword 41 in turn including a red 41A, green 41B and blue 41C color component, preferably RGB555. These color components 41A, 41B, 41B define a starting color value for all image elements in the block. The second color component 42 comprises a modifier table index or more preferably, as illustrated in the figure, two such modifier table indices 42A, 42B, one for each 2×4/4×2 sub-block. Each table index 42A, 42B is associated with and points to a modifier set index in a table comprising multiple, preferably eight, different such modifier sets. A color index sequence 43 includes, preferably for each image element in the block, a color index 43A specifying one of the multiple modifiers of the modifier set selected from the table based on the table index 42A, 42B associated with the sub-block, in which the particular image element is found.

The compressed block 40 further comprises a direction codeword 48, preferably utilizing the dRdGdB333 components 48A, 48B, 48C of the differential iPACKMAN/ETC scheme. This direction codeword 48 are used for specifying a direction (vector) in color space. The starting color value defined by the first color codeword 41 is then modified by the modifiers of the modifier set selected by the second color codeword 42 along a direction defined by the direction codeword 48 to form the multiple color representations.

The resulting multiple color representations are then modified by color modifiers represented by the color modifier codeword 44. This color modifier codeword 44 and the associated sequence 45 of color modifier indices 45A corresponds to the color modifier codeword and modifier index sequence illustrated in FIG. 9 and are not further described herein. Alternatively, a color modifying codeword 44 in the form of a table index can be used. In such a case, the color modifying codeword 44 allows identification of a color modifier set from the modifier table.

Figure 21:
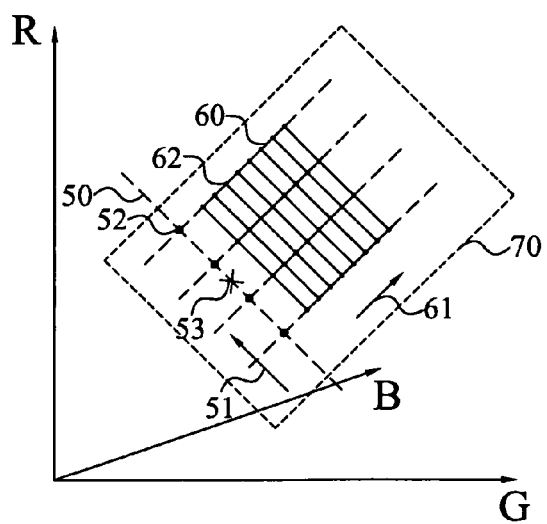
FIG. 21 is a diagram illustrating yet another grid of multiple color points on a plane in a color space, which points can be used for representing the colors of an image block.
Figure 20:
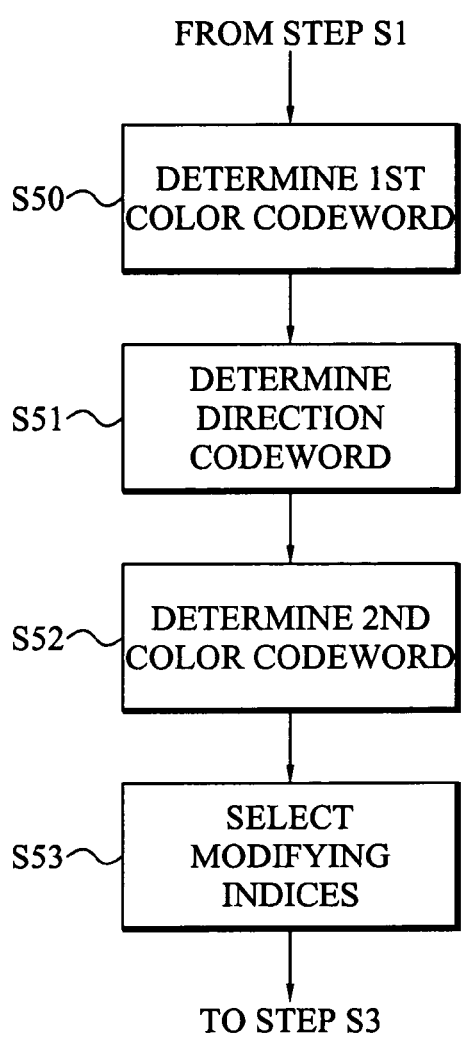
FIG. 20 is a flow diagram of an embodiment of the step of determining color codewords of FIG. 5.

FIG. 20 is a flow diagram illustrating an embodiment of the step of determining color codewords of FIG. 5 in more detail. The method continues from step S1 in FIG. 5. With reference to FIGS. 19 to 21, in a next step S50, a first color codeword 41 is determined for the image elements in the block to be compressed. This color codeword 41 represents a starting color value 53 in the RGB space. A direction codeword 48 is then determined in step S51 and represents a direction 51, e.g. angle or direction vector, in color space along which the starting color value is to be modified to generate multiple color representations 52 present on a line 50. Therefore, a second color codeword 42 is determined in step S52. This second color codeword preferably represents at least one table index 42A, 42B, preferably one such table index 42A, 42B per sub-block of the image block. A modifier table comprising multiple modifier sets is then available and the table index 42A, 42B identifies one of these modifier sets from the table. Each such modifier set in turn comprises multiple modifier values to be used for modifying the starting color value 53 along the direction 51. A next step S53 selects modifier indices 43A for the image elements in the block, where each of these modifier indices 43A is associated with one of the modifier values in the modifier set defined by the table index 42A, 42B. The method continues to step S3, where a color modifying codeword is determined.

As is seen in FIG. 21, a selected modifier set comprising four different modifier values will, when applied to the starting color value 53, generate four color representations 52 along the line 50. These four color representations are in turn modifiable using the color modifying codeword and the sequence of color modifier indices to obtain the grid 60 of multiple color points 62 on a surface/plane 70.

The dRdGdB333 part of iPACKMAN, see $D_0$ 48A, $D_1$ 48B, $D_2$ 48C in FIG. 19, is not an ideal way to represent a direction. To start with there are several codewords that represent the same direction. For instance, negating the codeword, e.g. from (−3, −2, 1) to (3, 2, −1), gives the same direction if the modifier sets from the modifier table are symmetric around zero, such as [−128, −63, 63, 128]. As a consequence, we have in total 51 redundant vector combinations and 256 in total giving 80% unique combinations.

However, another inefficiency comes from the fact that it will still be possible to represent directions that are parallel with the luminance direction i=[1, 1, 1]. As has been discussed in the foregoing, it may be preferred if the color codewords only have to be able to represent colors inside a plane, e.g. R+G+B−384=0 since the color modifying codeword will take care of the variance in the luminance direction which is orthogonal to this plane. Thus, it is wasteful to be able to represent colors in the direction [1, 1, 1].

Therefore, the first color codeword can be forced to represent the starting color value on the plane R+G+B−384=0 through only two color components, for example R and G, using RG88. B can then be calculated from these two color components and the plane equation as B=384−R−G.

In order to represent the direction, we can use an eight bit codeword where $0000\ 0000_{bin}$ means 0° and $1111\ 1111_{bin}$ represents 180° (or really 180×255/256=179.3°). For example, the number $0000\ 0000_{bin}$ could mean direction u=(−1, 1, 0) (which is parallel to the plane), the number $0011\ 1111_{bin}$ could represent v=(−1, −1, 2) (which is also parallel to the plane and orthogonal to u) and the number $0111\ 1111_{bin}$ represents −u. Note also that it may be wise to normalize u and v so that they have a length of 1, u'=1/√2(−1,1,0) and v'=1/√6(−1, −1,2).

In an alternative embodiment, the two four bit signed words are used to specify the direction, where the first 4-bit word specifies the u coordinate of the direction and the other 4-bit word specifies the v coordinate of the direction. Alternatively, the sign bit of the v coordinate can be removed and used for other purposes, since it can always be made to be positive in the same way as was discussed above for $D_0$, $D_1$, $D_2$.

In yet an alternative embodiment, the direction can be represented by a spread instead of an angle as is described in the document [7].

In these cases, the first color codeword and the direction codeword is valid for the entire 4×4 block. As a consequence, the flipbit is no longer needed and can e.g. be used to specify the color (RG88 becomes RG89) or the direction with one extra bit. Correspondingly, the diffbit could also be removed and instead be used to specify the color codewords or direction codeword.

Decompression

Figure 22:
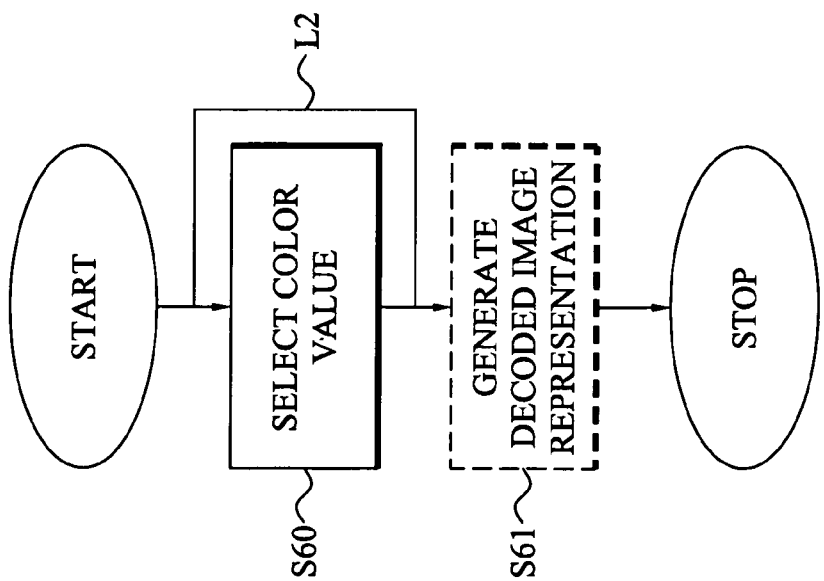
FIG. 22 is a flow diagram of a method of decompressing a compressed image and image block.

FIG. 22 illustrates a flow diagram of a method of decoding an encoded image or encoded version of an original image. The encoded image basically comprises several encoded representations of image blocks, such as representations 10, 20, 30, 40 of FIGS. 9, 16, 17, 19. These encoded block representations are preferably generated by the image encoding method discussed above.

The method generally starts by identifying encoded image block(s) to decode. It could be possible that all encoded image blocks of an encoded image should be decoded to generate a decoded representation of the original image. Alternatively, only a portion of the original image is to be accessed. As a consequence, only a selected number of image blocks have to be decoded (or more precisely, a selected amount of image elements of certain image blocks have to be decoded).

Once the correct encoded (representation(s) of) image block(s) is identified, step S60 selects, for an image element of the image block to be decoded, a color representation of the multiple color points in the grid on a surface in color space and defined by the color codewords and the color modifying codeword. Thus, each compressed image block is associated with, through the codewords of the block, multiple color points on a surface in color space, which are used as representations of the colors of the image elements in the block. In step S60, the color point of these multiple color points on the surface assigned to the relevant image element is selected and used as color representation for the image element. Step S60 could be performed for several image elements in the image block (schematically illustrated by line L2). It is anticipated by the invention that in some applications, only a single image element is decoded from a specific image block, multiple image elements of a specific image block are decoded and/or all the image elements of a specific block are decoded.

Step S60 is then preferably repeated for all image blocks that comprise image elements that should be decoded.

In the optional next step S61, a decoded representation of the original image, or a portion thereof, is generated based on the decoded image elements and blocks. Note that in some applications, several image elements have to be decoded in order to render a single pixel of the decoded representation. For example, during trilinear interpolation, eight image elements are decoded and for bilinear interpolation the corresponding number is four image elements, which is well known to the person skilled in the art. The method then ends.

Figure 23:
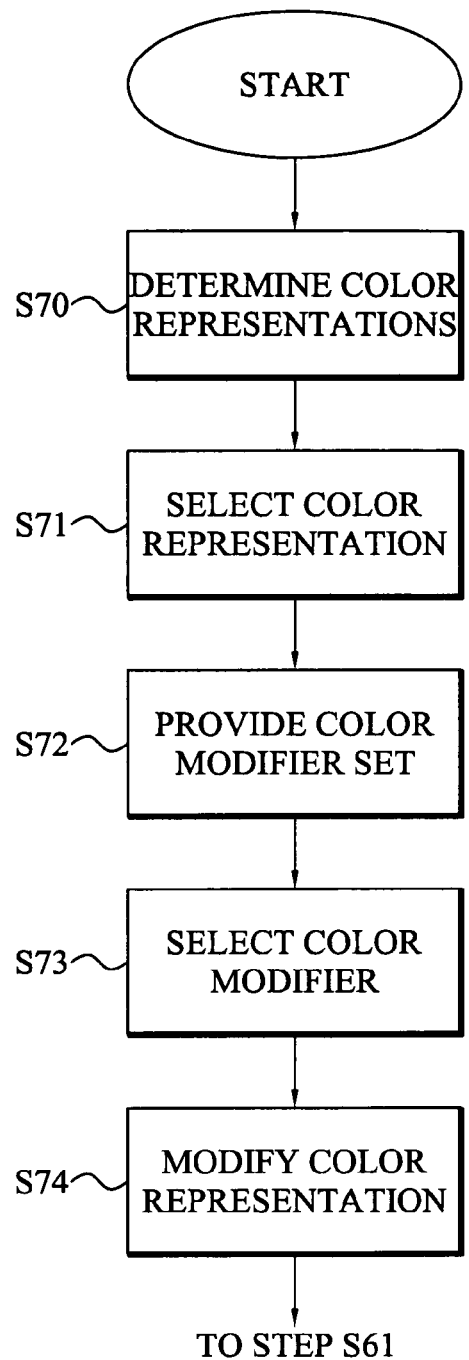
FIG. 23 is a flow diagram illustrating an embodiment of the selecting step of FIG. 22.

FIG. 23 is a flow diagram illustrating the selecting step in FIG. 22 in more detail according to an example embodiment. This embodiment is in particular adapted for decompressing a compressed image block as illustrated in FIG. 9. The method starts in step S70, where multiple color representations along a line in color space are determined using the two color codewords in the compressed block. In the next step S71, one of these multiple color representations is selected for the current image element based on a color index associated with the image element. A next step S72 provides, based on the color modifying codeword, a color modifier set comprising multiple color modifiers. This set provision can be realized by calculating, based on the color modifying codeword, the multiple color modifiers of the set. In an alternative embodiment, the color modifying codeword is a table index allowing identification and provision of the set from a color modifying table comprising multiple such sets, preferably together with an average or starting color modifying value. A color modifier of the provided set to use for the current image element is selected in step S73. This selection step S73 is preferably performed based on a color modifier index assigned to the image element and used for selecting one of the multiple color modifiers of the set. In a next step S74, the color representation selected in step S71 is modified with the color modifier selected in step S73 along a selected extension vector to obtain a color point, preferably a color point on the grid, as color representation of the image block.

This color modification refers to modifying, e.g. adding or multiplying all color components of the color representation by the (possibly weighted) color modifier value, possibly along a selected (based on direction codeword) or predefined (luminance direction) direction. The resulting modified value can optionally be further processed, e.g. clamped between a minimum value, such as 0, and a maximum value, such as 255. The method then continues to step S61 of FIG. 22.

In an alternative embodiment, all of the multiple color representations are determined in step S70 based on the color codewords. All of these color representations are then modified with all color modifiers in step S74 of the modifier set, which in turn has been provided in step S72. As a consequence, a grid or other pattern of multiple color points $RGB_{ij}$ can be obtained, where i=0 to M−1 and j=0 to N−1 and M represents the number of multiple color representations and N represents the number of color modifiers in the provided set. The color index and color modifier index of the image element specify i, j and are therefore used for selecting one of the M×N possible color points.

Thus, in this embodiment all possible color points assignable for the compressed image block is first calculated. This embodiment can be particularly advantageous if all or at least a majority of the image elements in the image block are to be decoded.

A further alternative embodiment is particularly suitable when only a single or few image elements is/are to be decoded. In such a case, only the color representation associated with a particular image element is determined in step S70 based on the color codewords and the color index assigned to the image element. Correspondingly, only the color modifier assignable for this image element is then provided based on the color modifying codeword and the color modifying index of the image element. The determined color representation is then modified by the provided color modifier to obtain the correct color point for the image element. This embodiment requires fewer calculations as compared to the embodiments above if one or few image elements are decoded.

Figure 24:
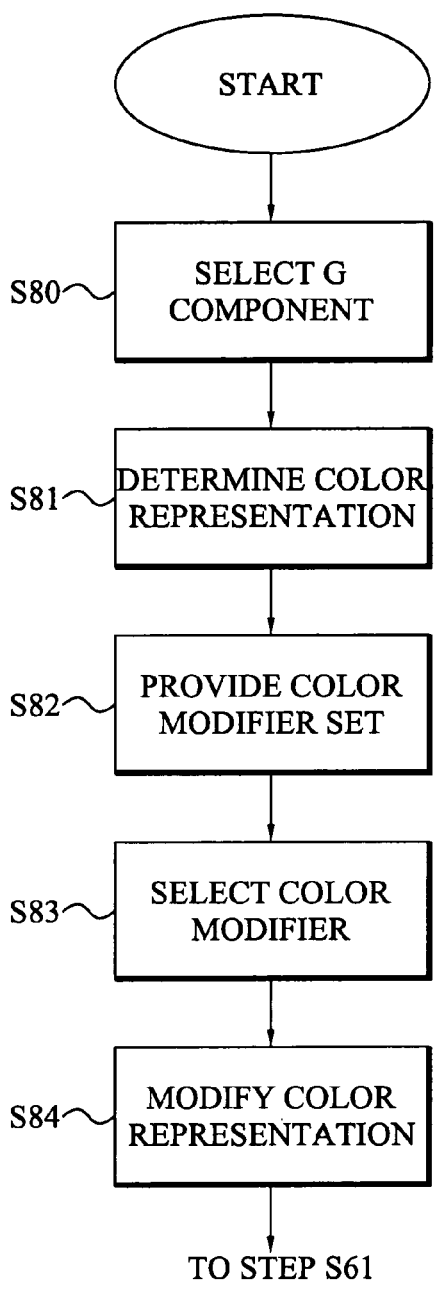
FIG. 24 is a flow diagram illustrating another embodiment of the selecting step of FIG. 22.

FIG. 24 is a flow diagram of the selecting step of FIG. 22 according to another example embodiment, suitable for processing a compressed image block as illustrated in FIG. 16 or 17. The method starts in step S80, where a green color component to use for an image element is selected based on the second color codeword and a color index associated with the image element. A color representation is then determined based on this selected green color component and the first color codeword in step S81. A color modifier set to use for the image block is provided in step S82 based on the color modifying codeword that is preferably a table index in this embodiment. In step S83, the color modifying index associated with the image elements is used for selecting the color modifier of the provided modifier set applicable for the image element. Finally, the determined color representation is modified by the selected color modifier in step S84 along a selected, e.g. predefined, extension vector, which is basically performed as described above with reference to step S74 of FIG. 23. The method then continues to step S61 of FIG. 22.

Figure 25:
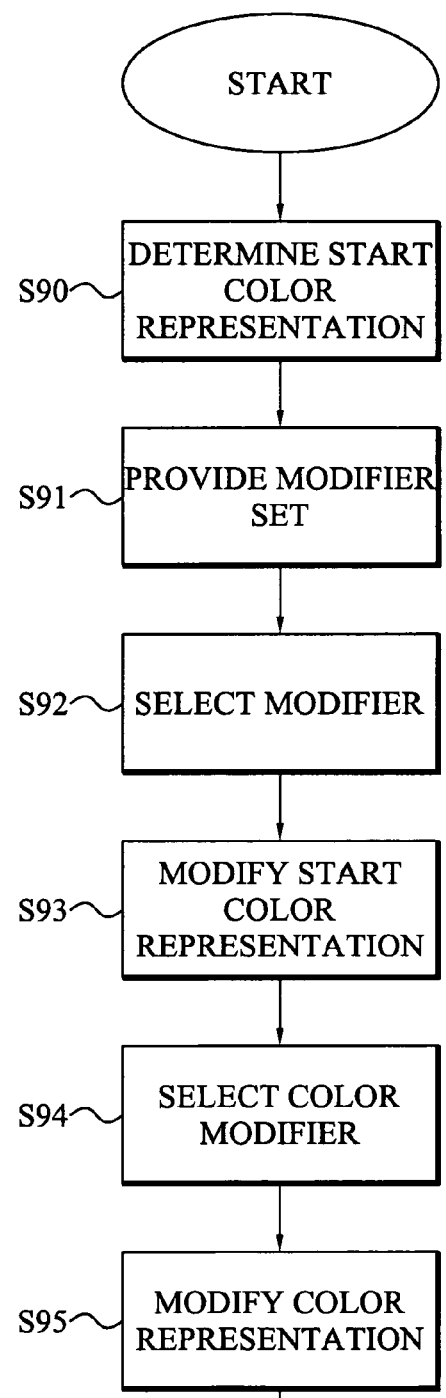
FIG. 25 is a flow diagram illustrating a further embodiment of the selecting step of FIG. 22.

FIG. 25 is a flow diagram of the selecting step of FIG. 22 according to a further embodiment adapted for a compressed image block as illustrated by FIG. 19. In a first step S90, a starting color value or representation is determined based on the first color codeword. A modifier set to use for an image element to be decoded is provided in step S91 based on the second color codeword, which is preferably a table index. In the next step S92, one of the modifiers of the provided modifier set is selected based on the color index of the image element. The determined starting color value is modified by the selected modifier in step S93, preferably along a direction defined by the direction codeword. This modification can be performed by going from the starting value along the defined direction a distance corresponding to the modifier value. The result is the color representation for this image element. A next step S94 selects, based on the color modifying codeword and the color modifying index of the image element, a color modifier to employ when modifying the color representation in step S95 to provide the color point that is the final color representation for the image element. The method then continues to step S61 in FIG. 22.

DECOMPRESSION EXAMPLE

Example 1

An example of a decompression procedure for the image block illustrated in FIG. 9 is given herein. Assume that the image block has the following binary compressed representation:

10110 010110 01101 01110 100011 00001 10 10 00 01 11 00 00 11 10 10 01 00 11 00 11 01$_{bin}$
00010010 01011101 110 001 111 001 011 101 000 111 101 110 100 001 011 100 001 101$_{bin}$ The color components of the two color components are first expanded from RGB565 into RGB888, by replicating the three or two most significant bits to the components. For example, 10110$_{bin}$ becomes 10110101$_{bin}$ and 010110$_{bin}$ becomes 01011001$_{bin}$. This means that the two basic colors CV0, CV1 are obtained from the color codeword:
10110$_{bin}$⇒10110101$_{bin}$=181
010110$_{bin}$⇒01011001$_{bin}$=89
01101$_{bin}$⇒01101011$_{bin}$=107
CV0=(181, 89, 107)
01110$_{bin}$⇒01110111$_{bin}$=115
100011$_{bin}$⇒10001110$_{bin}$=142
00001$_{bin}$⇒00001000$_{bin}$=4
CV1=(115, 142, 4)

The two first color representations are then (181, 89, 107) and (115, 142, 4). The other two representations CV2 and CV3 are calculated as linear combinations of these two as has been described previously: CV2=(159, 107, 73) and CV3=(137, 124, 38).

Correspondingly, the color modifying codeword represents a minimum (00010010$_{bin}$) and maximum (01011101$_{bin}$) modifier value that corresponds to $I_0$=18 and $I_1$=93. The other modifier values can then be calculated as linear combinations of these two to obtain: $I_2$=28, $I_3$=38, $I_4$=49, $I_5$=60, $I_6$=71 and $I_7$=81 if one of the previously described linear calculations is employed.

The first image element in the block has color index 10$_{bin}$ and color modifying index 110$_{bin}$. This means that color representation CV2 (159, 107, 73) and color modifier $I_6$=71 should be used. As a consequence, the final color point will be (159+71−128, 107+71−128, 73+71−128)=(102, 150, 16), which is the color representation for this first image element. The same procedure is performed for the other fifteen image elements. The subtraction with 128 is preferably performed so that color modifiers in the interval [−128, 127] can be encoded using bit combinations 00000000$_{bin}$ to 11111111$_{bin}$.

Example 2

An example of a decompression procedure for the image block illustrated in FIG. 16 is given herein. Assume that the image block has the following binary compressed representation:

1011 0010 0000 0000 0111 0100 011 000 10 10 00 01 11 00 00 11 10 10 01 00 11 00 11 01 1 0$_{bin}$ 00010010 01011101 110 001 111 001 011 101 000 111 101 110 100 001 011 100 001 101$_{bin}$ The eight possible green component values are calculated based on the minimum and maximum green component of the second codeword in way similar to determining the different color modifiers in Example 1 above. This will result in $G_0$=18, $G_1$=93, $G_2$=28, $G_3$=38, $G_4$=49, $G_5$=60, $G_6$=71 and $G_7$=81. The first image element in the block has color index 110$_{bin}$, which implies that green component $G_6$ should be used. Since the first image element belongs to the first 2×4 (vertical, due to flipbit=1$_{bin}$) sub-block, the red $R_0$ and blue $B_0$ components of the first color codeword having the following bit patterns should be used 1011$_{bin}$ and 0111$_{bin}$. After expansion into eight bits, we obtain 10111011$_{bin}$=187 and 01110111$_{bin}$=119 and the color representation RGB=(187, 71, 119).

The color modifying codeword for the first sub-block is 011$_{bin}$, which implies that a color modifier set of [−42, −13, 13, 42] should be used if a color modifier table according to Table II is employed. The first image element has assigned color modifier index 10$_{bin}$. This means that a color modifier of −13 is selected from the modifier set. The modifier value is then added to the red and blue color components of the determined color representation giving (187−13, 71, 119−13)=(174, 71, 106) as color point for the first image element. The procedure is then repeated for the remaining image elements.

Example 3

An example of a decompression procedure for the image block illustrated in FIG. 17 is given herein. Assume that the image block has the following binary compressed representation:
10110 010 00000 000 01110 100 011 000 10 10 00 01 11 00 00 11 10 10 01 00 11 00 11 01 0 1$_{bin}$
01000010 01011101 110 001 111 001 011 101 000 111 101 110 100 001 011 100 001 101$_{bin}$ In this example, the flipbit=0$_{bin}$, implying that the image block consists of two 4×2 sub-blocks and the diffbit=1$_{bin}$, representing the differential mode of iPACKMAN.

Firstly a starting green component is determined based on the first portion of the second color codeword, i.e. 01000010$_{bin}$=66. The second part represents a table index to a table comprising multiple sets of green component modifiers. Assume that the table index of 01011101$_{bin}$ represents the green modifier set of [−42, −36, −27, −15, 15, 27, 36, 42]. The last image element in the block has color index 101$_{bin}$, which represents a green modifier of −27. The resulting modified green component is then 66−27=39.

The red and blue components are obtained, for the image elements of the second sub-block, to which the last image element belongs, from R+dR and B+dB. In this illustrative example, dR and dB are limited to values in the interval [−4, 3]. R+dR=10110$_{bin}$+010$_{bin}$=11000$_{bin}$, which is expanded into 11000110$_{bin}$=198. B+dB=01110$_{bin}$+100$_{bin}$=01001$_{bin}$, which is expanded into 01010010$_{bin}$=82. The color representation thus becomes (198, 39, 82).

The table index of the color modifying codeword for the last image element is 000$_{bin}$, which corresponds to the modifier set [−8, −2, 2, 8] according to Table II. The color modifier index of the image element is 01$_{bin}$, which is associated with the color modifier 8. The color point for the last image element is thus (198+8, 39, 82+8)=(206, 0, 90). The same procedure can then be performed for the other image elements.

Example 4

An example of a decompression procedure for the image block illustrated in FIG. 19 is given herein. Assume that the image block has the following binary compressed representation:
10110 010 00010 000 01110 100 011 000 10 10 00 01 11 00 00 11 10 10 01 00 11 00 11 01 0 1$_{bin}$
00010010 01011101 110 001 111 001 011 101 000 111 101 110 100 001 011 100 001 101$_{bin}$ The starting color value is then given by first color codeword RGB, where
R=10110$_{bin}$ is expanded into 10110101$_{bin}$=181
G=00010$_{bin}$ is expanded into 00010000$_{bin}$=16
B=01110$_{bin}$ is expanded into 01110011$_{bin}$=115

A first image element in the block has color index 10$_{bin}$ and should use a table index of 011$_{bin}$ for selecting modifier set. Such a table index corresponds to a color modifier set of [−42, −13, 13, 42] according to Table II. This means that a modifier of −13 is applicable for this image element. The direction codeword has in this case three components that are used for representing the x, y and z components of the direction vector. $D_0$=010$_{bin}$, which represents 2, $D_1$=000$_{bin}$=0 and $D_2$=100$_{bin}$=−4. Thus, the direction vector v=[2, 0, −4] should be used for modifying the starting color value a distance of −13 from the starting color value. This is the same as starting from the starting color value and moving a distance of 13 in the direction of [−2, 0, 4], which results in the color representation (175, 16, 127).

The color modifiers are calculated in the same manner as in Example 1 and the color modifier to use for the first image element is $I_6$=71. This modifier value is added to the color components of the color representation, which results in the final color point of (175+71−128, 16+71−128, 127+71−128)=(118, 0, 70) after clamping for the first image element.

Implementation Aspects

The image encoding (image block encoding) and image decoding (image block decoding or processing) scheme could be provided in a general data processing system, e.g. in a user terminal or other unit configured for processing and/or rendering images. Such a terminal could be a computer, e.g. PC, a game console or a thin client, such as a Personal Digital Assistance (PDA), mobile unit and telephone.

User Terminal

FIG. 26 illustrates a user terminal 100 represented by a mobile unit. However, the invention is not limited to mobile units by could be implemented in other terminals and data processing units, such as PC computers and game consoles. Only means and elements in the mobile unit 100 directly involved are illustrated in the figure.

The mobile unit 100 comprises a (central) processing unit (CPU) 200 for processing data, including image data, within the mobile unit 100. A graphic system 130 is provided in the mobile unit 100 for managing image and graphic data. In particular, the graphic system 130 is adapted for rendering or displaying images on a connected screen 120 or other display unit. The mobile unit 100 also comprises a storage or memory 140 for storing data therein. In this memory 140 image data may be stored, in particular encoded image data (encoded image blocks).

An image encoder 210 is provided in the mobile unit 100. This encoder 210 is configured for encoding an image or texture into an encoded representation of the image (or texture). As was discussed above, such an encoded representation comprises a sequence or file of multiple encoded image blocks. This image encoder 210 may be provided as software running on the CPU 200, as is illustrated in the figure. Alternatively, or in addition, the encoder 210 could be arranged in the graphic system 130 or elsewhere in the mobile unit 100.

An encoded representation of an image from the block encoder 210 may be provided to the memory 140 over a (memory) bus 150, for storage therein until a subsequent rendering of the image. Alternatively, or in addition, the encoded image data may be forwarded to an input and output (I/O) unit 110 for (wireless or wired) transmission to other external terminals or units. This I/O unit 110 can also be adapted for receiving image data from an external unit. This image data could be an image that should be encoded by the image encoder 210 or encoded image data that should be decoded. It could also be possible to store the encoded image representation in a dedicated texture memory provided, for example, in the graphic system 130. Furthermore, portions of the encoded image could also, or alternatively, be (temporarily) stored in a texture cache memory, e.g. in the graphic system 130.

An image decoder 220 is provided in the mobile unit 100 for decoding an encoded image in order to generate a decoded image representation. This decoded representation could correspond to the whole original image or a portion thereof. The image decoder 220 provides decoded image data to the graphic system 130, which in turn typically processes the data before it is rendered or presented on the screen 120. The image decoder 220 can be arranged in the graphic system 130, as is illustrated in the figure. Alternatively, or in addition, the decoder 200 can be provided as software running on the CPU 200 or elsewhere in the mobile unit 100.

The mobile unit 100 could be equipped with both an image encoder 210 and an image decoder 220, as is illustrated in the figure. However, for some terminals 100 it could be possible to only include an image encoder 210. In such a case, encoded image data could be transmitted to another terminal that performs the decoding and, possibly, rendering of the image.

Correspondingly, a terminal 100 could only include an image decoder 220, i.e. no encoder. Such a terminal 100 then receives a signal comprising encoded image data from another terminal and decodes it to generate a decoded image representation. Thus, the encoded image signal could be wirelessly be transmitted between terminals using radio transmitter and receiver. Alternatively, other techniques for distributing images and encoded image representations between terminals according to the invention could be employed, such as Bluetooth®, IR-techniques using IR ports and wired transferring of image data between terminals. Also memory cards or chips that can be connected and exchanged between terminals could be used for this image data inter-terminal distribution.

The units 110, 130, 200, 210 and 220 of the mobile unit 100 may be provided as software, hardware or a combination thereof.

Image Encoder

FIG. 27 illustrates a block diagram of an example embodiment of an image encoder 210. The encoder 210 typically comprises an image decomposer 215 for decomposing or dividing an input image into several image blocks. The decomposer 215 is preferably configured for decomposing the image into image blocks comprising sixteen image elements (pixels, texels or voxels), i.e. having a general size of 4×4 image elements. This decomposer 215 could be adapted for decomposing different input images into image blocks with different sizes. In such a case, the decomposer 215 preferably receives input information, enabling identification of which image block format to use for a given image.

This embodiment of the image encoder 210 comprises a single block encoder 300. This block encoder 300 encodes the image block(s) received from the image decomposer to generate encoded block representation(s). Such an image block representation comprises a first and second color codeword, a color modifying codeword and preferably also a sequence of color indices, a sequence of color modifier indices and optionally a direction codeword. The overall size of the block representation is smaller than the corresponding size of the uncoded image block. The block encoder 300 is preferably configured for processing (encoding) each image block from the decomposer 215 sequentially.

In an alternative implementation, the encoder 210 includes multiple block encoders 300 for processing multiple image blocks from the image decomposer 215 in parallel, which reduces the total image encoding time.

The units 215 and 300 of the image encoder 210 may be provided as software, hardware or a combination thereof. The units 215 and 300 may be implemented together in the image encoder 210. Alternatively, a distributed implementation is also possible with some of the units provided elsewhere in the mobile unit.

Block Encoder

FIG. 28 illustrates a block diagram of an example embodiment of a block encoder 300, such as the block encoder of the image encoder in FIG. 27. The encoder 300 comprises a color codeword determiner 310 that determines the first and second color codeword of the compressed block representation. These two color codewords together define multiple different discrete color representations present on a line in color space.

A color modifier codeword determiner 320 is likewise provided in the block encoder 300 for generating a color modifying codeword to use for a current image block. This color modifying codeword represents a set of multiple color modifiers that used for modifying the multiple color representations along at least one extension vector to form color points on a surface defined by the color representations and the at least one extension vector.

In a preferred embodiment, the block encoder also comprises a color index selector 330 for selecting, preferably for each image element in the block or at least each image element in a subset of the image elements in the block, a color index associated with one of the multiple color representations defined by the two color codewords determined by the color codeword determiner 310. Correspondingly, the block encoder 300 preferably comprises a color modifier index selector 340. This selector 340 determines, preferably for each image element in the block or at least each image element in a subset of the image elements in the block, a color modifier index associated with one of the multiple color modifiers in the modifier set defined by the color modifying codeword determined by the color modifier codeword determiner 320.

An optional color projector 350 can be implemented in the block encoder 300 for potentially projecting the colors of an image block to be encoded onto a plane in color space, so that two color codewords determined by the color codeword determiner 310 only carries chrominance information and any luminance information is contained in the color modifying codeword determined by the modifier codeword determiner 320.

The units 310 to 350 of the block encoder 300 may be provided as software, hardware or a combination thereof. The units 310 to 350 may be implemented together in the block encoder 300. Alternatively, a distributed implementation is also possible with some of the units provided elsewhere in the image encoder.

It is anticipated that the block encoder could comprise a separate error estimator for estimating error values for the purpose of selecting color codewords, color modifying codewords, color indices and color modifier indices. Alternatively, this error estimating functionality is housed in any of the units illustrated in FIG. 28. In either case, this estimator is preferably configured for calculating an error value for a first selection of codewords and indices for the image elements in the image block. This first error value is then stored. The error calculation is then repeated for all possible selections of codewords and indices, and after each calculation the estimated error value is compared to the stored error. If it is smaller than the stored value, it replaces the previously stored error. In addition, the selection of codewords and indices associated with the error value are also stored. Once all combinations have been tested, the selection resulting in the smallest error is used for generation of color codewords, color modifying codeword, color index sequence and color modifier index sequence.

FIG. 29 is a block diagram of an embodiment of the color modifier codeword determiner 320 of FIG. 29. This determiner embodiment comprises a unit 322 for determining a minimum color modifier for the image block and a unit 324 for determining a maximum color modifier. All color modifiers of modifier set can then be calculated as linear combinations of these two color modifier values.

In an alternative embodiment, the color modifier codeword determiner 320 is arranged for identifying a color modifier set to use for a current image block. This determiner 320 is preferably configured for selecting this modifier set from an associated color modifier table, typically provided in a memory unit (not illustrated). The determiner 320 then generates a color modifying codeword that is associated with the selected modifier set and functions as a table index. In a preferred extension, the determiner 320 could also generate an average or starting color modifier value that used together with the color modifiers in a process of modifying the color representations represented by the color codewords.

The units 322 and 324 of the color modifier codeword determiner 320 may be provided as software, hardware or a combination thereof. The units 322 and 324 may be implemented together in the color codeword determiner 320. Alternatively, a distributed implementation is also possible with some of the units provided elsewhere in the block encoder.

A possible implementation of a color codeword determiner 310 is illustrated in the block diagram of FIG. 30. The codeword determiner 310 comprises means 312 configured for determining a first color codeword and means 314 for determining a second color codeword. The two determined color codewords could, for example, be two RGB565 codewords, two RG88 codeword, a R0B444 and a G8 codeword, a R0B555, dR0dB333 and a G8 codeword, a RGB555 codeword or a RG88 codeword together with a modifier table index.

The color codeword determiner 310 may optionally also comprise a direction codeword determiner 316 for determining a direction codeword to use when modifying a color starting value to generate multiple color representations. Correspondingly, the color index selector 318 can be arranged in the color codeword determiner 310 instead of in the block encoder 300 and is provided for determining the color indices for the image elements.

The units 312 to 318 of the color codeword determiner 310 may be provided as software, hardware or a combination thereof. The units 312 to 318 may be implemented together in the color codeword determiner 310. Alternatively, a distributed implementation is also possible with some of the units provided elsewhere in the block encoder.

Image Decoder

FIG. 31 illustrates a block diagram of an example embodiment of an image decoder 220. The image decoder 220 preferably comprises a block selector 222 that is adapted for selecting, e.g. from a memory, which encoded image block(s) that should be provided to a block decoder 400 for decoding. The block selector 222 preferably receives input information associated with the encoded image data, e.g. from a header or a rendering engine. An address of an encoded image block having the desired image element(s) is then computed based on the input information. This computed address is preferably dependent upon the image-element (pixel, texel or voxel) coordinates within an image. Using the address, the block selector 222 identifies the encoded image block from the memory. This identified encoded image block is then fetched from the storage and provided to the block decoder 400.

The (random) access to image elements of an image block advantageously enables selective decoding of only those portions of an image that are needed. Furthermore, the image can be decoded in any order the data is required. For example, in texture mapping only portions of the texture may be required and these portions will generally be required in a non-sequential order. Thus, the image decoding can with advantage by applied to process only a portion or section of an image.

The selected encoded image block is then forwarded to the block decoder 400. In addition to the image block, the decoder 400 preferably receives information specifying which image elements of the block that should be decoded. The information could specify that the whole image block, i.e. all image elements therein, should be decoded. However, the received information could identify only a single or a few of the image elements that should be decoded. The block decoder 400 then generates a decoded representation of the image element(s) in the block. This decoded representation is preferably a P-bit color, where P is the number of bits per image element in the original image, e.g. a 24-bit RGB color. Another possible representation is a float (floating point number) RGB color.

An optional image composer 224 could be provided in the image decoder 220. This composer receives the decoded image elements from the block decoder 400 and composes them to generate a pixel that can be rendered or displayed on a screen. The composer 224 could require several input image elements to generate a single pixel. This image composer 224 could alternatively be provided in the graphic system.

Alternatively, the image decoder 220 comprises multiple block decoders 400. By having access to multiple block decoders 400, the image decoder 220 can process (decode) multiple encoded image blocks in parallel. These multiple block decoders 400 allow for parallel processing that increases the processing performance and efficiency of the image decoder 220.

The units 222, 224 and 400 of the image decoder 220 may be provided as software, hardware or a combination thereof. The units 222, 224 and 400 may be implemented together in the image decoder 220. Alternatively, a distributed implementation is also possible with some of the units provided elsewhere in the user terminal.

Block Decoder

FIG. 32 is an illustration of an example embodiment of a block decoder 400. The block decoder 400 comprises a color generator 410 that can generate multiple color representations using the two color codewords in the compressed block representation.

A color modifier provider 420 is arranged in the block decoder 400 for providing, based on the color modifying codeword, a set of multiple color modifiers. This modifying codeword can be in the form of a table index so that the provider 420 provides the modifier set from an associated modifier table arranged in e.g. in a memory unit (not illustrated) in the block decoder 400. Alternatively, the provider 420 uses the color modifying codeword for calculating the multiple modifier values of the set.

The color representations and color modifiers are forwarded from the generator 410 and the provider 420 to an index selector 430. This index selector 430 utilizes the color index and color modifying index for the different image elements to select which color representation and which color modifier to use for a particular image element. If a given image element has a pre-defined association with one of the color representations and/or modifier values, the selector 430 of course need no color index and/or color modifier index to select the correct color representation and/or color modifier for that image element.

The selected color representation and color modifier are forwarded to a color modifier 440 arranged in the block decoder 400 for modifying the received color representation with the provided color modifier. Modifying in this context is preferably performed by adding the color modifier to the color components of the color representation, possible along at least one selected extension vector (defined by a direction codeword) or at least one predefined extension vector, such as the luminance vector. In alternative implementations other forms of color modification, e.g. using multiplication, XOR-operations, etc. could instead be used by the color modifier 440. In an optionally implementation, the color modifier 440 can clamp the resulting color component values between a minimum, e.g. 0, and a maximum, e.g. 255, color value if possible falling below the minimum value or exceeding the maximum value.

The resulting color modified value will be one of the color points on a surface in color space and is used as representations of the true original color of an image element.

As has been briefly mentioned above, the color generator 410 can determine all multiple color representations and then the particular color representation to use for a current image element is further processed. Alternatively, the color generator 410 could generate only the color representation associated with the current image element and therefore not calculate the remaining color representations. In such a case, the color generator 410 preferably received input information of which color representation to calculate from the index selector 430.

In yet another embodiment, the color generator 410 determines, based on the color codewords, all multiple color representations. In addition, the color modifier 440 modifies all these respective multiple color representations with the color modifiers of the modifier set received from the modifier provider 420. This means that M×N color points are derived if the color generator 410 generates M color representations and the provided modifier set comprises N color modifiers. The index selector 430 then utilizes, for each image element that should be decoded, the color index and color modifier index to select one of these M×N color points to use as color value for the image element.

The units 410 to 440 of the block decoder 400 may be provided as software, hardware or a combination thereof. The units 410 to 440 may be implemented together in the block decoder 400. Alternatively, a distributed implementation is also possible with some of the units provided elsewhere in the image decoder.

FIG. 33 is a schematic block diagram of an embodiment of a color generator 410 that can be implemented in the block decoder of FIG. 32. This color generator 410 comprises a color calculator 412 for calculating, based on the first color codeword, a starting color value or point in color space. A direction determiner 411 is arranged in the generator 410 for determining, based on the direction codeword, a direction, e.g. angle, direction vector, etc., in color space, along which the starting color value is to be modified.

The color generator 410 also comprises 1 modifier provider 413 that uses the second color codeword to provide a set of multiple modifiers used by a modifier 417 to modify the starting color value calculated by the calculator 412 along the direction determined by the direction determiner 411. The modifier provider 413 preferably uses the second color codeword as a table index to a table comprising multiple sets, which each comprises multiple different modifiers. This table can, for instance, be arranged in a memory unit (not illustrated) in the color generator 410 or in the block decoder.

A modifier selector 415 is preferably implemented in the generator 410 for selecting, based on a color index assigned to an image element, which of the modifiers in the provided modifier set to use for the image element. This selected modifier value is provided or signaled to the color modifier 417 to use when modifying the starting color value along the direction to obtain the color representation for this image element, which will be subsequently color modified by the color modifier in the block decoder.

The units 411 to 417 of the color generator 410 may be provided as software, hardware or a combination thereof. The units 411 to 417 may be implemented together in the color generator 410. Alternatively, a distributed implementation is also possible with some of the units provided elsewhere in the block decoder.

It will be understood by a person skilled in the art that various modifications and changes may be made to the technology described herein without departure from the scope of the appended claims.

REFERENCES

[1] Delp, Mitchell: Image Compression using Block Truncation Coding. *IEEE Transactions on Communications* 2, 9 (1979), 1335-1342
[2] Campbell, Defant, Frederiksen, Joyce, Leske, Lindberg, Sandin: Two Bit/Pixel Full Color Encoding. *In Proceedings of SIGGRAPH* (1986), vol. 22, pp. 215-223
[3] U.S. Pat. No. 5,956,431
[4] International application WO 2005/059836
[5] International application WO 2006/006915
[6] Ström, Akenine-Möller: iPACKMAN high-quality, low complexity texture compression for mobile phones, *Graphics Hardware* 05, Los Angeles, USA, June 2005
[7] Wildberger: Divine proportions: Rational trigonometry to universal geometry, published by Wild Egg Books, September 2005

The invention claimed is:

1. A method of compressing an image block comprising multiple image elements, said method comprising:

determining, by a computer-implemented color codeword determiner, a first and a second color codeword defining multiple discrete color representations along a line in a color space; and determining, by a computer-implemented color modifier codeword determiner, a color modifying codeword representing a set of multiple color modifiers for modifying said multiple discrete color representations along at least one selected extension vector in said color space to obtain, for each of said discrete multiple color representations, a set of multiple color points, wherein said multiple color points of said sets are located on a surface defined by said multiple color representations and said at least one selected extension vector and wherein colors of said image elements are approximated by said multiple color points of said sets.

2. The method according to claim 1, wherein said multiple color points of said sets collectively forming a grid on said surface and wherein colors of said image elements are approximated by said multiple color points of said grid.

3. The method according to claim 1, wherein said surface is a plane that is uniquely defined by a direction vector defining a direction of said line, said at least one selected extension vector and at least one color representation of said multiple discrete color representations.

4. The method according to claim 1, wherein said at least one extension vector is a luminance direction vector in said color space.

5. The method according to claim 1, further comprising:
selecting, for each image element in said image block, a color index associated with a color representation from said multiple color representations along said line; and
selecting, for each image element in said image block, a color modifying index associated with a color modifier from said color modifier set.

6. The method according to claim 1, wherein determining said color modifying codeword comprises:
determining a representation of a minimum color modifier; and
determining a representation of a maximum color modifier, wherein said multiple color modifiers being linear combinations of said maximum color modifier and said minimum color modifier.

7. The method according to claim 1, wherein determining said first and second color codeword comprises:
determining a representation of a first color representation; and
determining a representation of a second color representation,
wherein said multiple discrete color representations being linear combinations of said first color representation and said second color representation.

8. The method according to claim 1, wherein determining said first and second color codeword comprises:
determining said first color codeword as a representation of a starting color representation in said color space;
determining a direction codeword as a representation of a direction in said color space;
determining said second color codeword as a representation of a set of multiple modifiers for modifying said starting color representation along said direction to obtain said multiple discrete color representations along said line; and
selecting, for each image element in said at least a portion of said image block, a color index associated with a modifier from said modifier set.

9. The method according to claim 1, further comprising projecting said colors of said image elements to a predefined plane in said color space so that said colors have constant luminance.

10. The method according to claim 9, wherein said predefined plane goes through a grey point in said color space and is orthogonal to a luminance direction vector in said color space.

11. The method according to claim 9, wherein determining a color modifying codeword comprises determining a luminance codeword representing a set of multiple luminance modifiers for modifying a luminance of said multiple discrete color representations along a luminance direction vector to obtain, for each of said discrete multiple color representations, a set of multiple color points, wherein said multiple color points of said sets collectively forming a grid on a plane uniquely defined by a direction vector of said line, said luminance direction vector and at least one color representation of said multiple discrete color representations and wherein colors of said image elements are approximated by said multiple color points of said sets.

12. The method according to claim 9, wherein determining said first and said second color codeword comprises:
determining a first and a second color component of said first color codeword; and
determining a first and a second color component of said second color codeword,
wherein a respective third color component of said first and second color codeword can be calculated from said respective first and second color component.

13. A computer program product stored on a computer-readable medium and defining a block encoder for compressing an image block comprising multiple image elements, said computer program product comprising coded instructions which, when executed by a computer, perform the functions of:
determining a first and a second color codeword defining multiple discrete color representations along a line in a color space; and
determining a color modifying codeword representing a set of multiple color modifiers for modifying said multiple discrete color representations along at least one selected extension vector in said color space to obtain, for each of said discrete multiple color representations, a set of multiple color points, wherein said multiple color points of said sets are located on a surface defined by said multiple color representations and said at least one selected extension vector and wherein colors of said image elements are approximated by said multiple color points of said sets.

14. The computer program product according to claim 13, wherein said multiple color points of said sets collectively forming a grid on said surface and wherein colors of said image elements are approximated by said multiple color points of said grid.

15. The computer program product according to claim 13, wherein said surface is a plane that is uniquely defined by a direction vector defining a direction of said line, said at least one selected extension vector and at least one color representation of said multiple discrete color representations.

16. The computer program product according to claim 13, wherein said at least one extension vector is a luminance direction vector in said color space.

17. The computer program product according to claim 13, further comprising:
a color index selector configured to select, for each image element in said image block, a color index associated with a color representation from said multiple color representations along said line; and a color modifier index selector configured to select, for each image element in said image block, a color modifying index associated with a color modifier from said color modifier set.

18. The computer program product according to claim 13, wherein said color modifier codeword determiner comprises:
means for determining a representation of a minimum color modifier; and
means for determining a representation of a maximum color modifier,
wherein said multiple color modifiers being linear combinations of said maximum color modifier and said minimum color modifier.

19. The computer program product according to claim 13, wherein said color codeword determiner comprises:
means for determining a representation of a first color representation; and
means for determining a representation of a second color representation,
wherein said multiple discrete color representations being linear combinations of said first color representation and said second color representation.

20. The computer program product according to claim 13, wherein said color codeword determiner comprises:
means for determining said first color codeword as a representation of a starting color representation in said color space;
means for determining a direction codeword as a representation of a direction in said color space;
means for determining said second color codeword as a representation of a set of multiple modifiers for modifying said starting color representation along said direction to obtain said multiple discrete color representations along said line; and
an index selector configured to select, for each image element in said at least a portion of said image block, a color index associated with a modifier from said modifier set.

21. The computer program product according to claim 13, further comprising means for projecting said colors of said image elements to a predefined plane in said color space so that said colors have constant luminance.

22. The computer program product according to claim 21, wherein said predefined plane goes through a grey point in said color space and is orthogonal to a luminance direction vector in said color space.

23. The computer program product according to claim 21, wherein said color modifier codeword determiner is configured to determine a luminance codeword representing a set of multiple luminance modifiers for modifying a luminance of said multiple discrete color representations along a luminance direction vector to obtain, for each of said discrete multiple color representations, a set of multiple color points, wherein said multiple color points of said sets collectively forming a grid on a plane uniquely defined by a direction vector of said, said luminance direction vector and at least one of said multiple discrete color representations and wherein colors of said image elements are approximated by said multiple color points of said sets.

24. The computer program product according to claim 21, wherein said color codeword determiner comprises:
means for determining a first and a second color component of said first color codeword; and
means for determining a first and a second color component of said second color codeword,
wherein a respective third color component of said first and second color codeword can be calculated from said respective first and second color component.

25. A block encoder for compressing an image block comprising multiple image elements, said block encoder comprising:
a computer-implemented color codeword determiner configured to determine a first and a second color codeword defining multiple discrete color representations along a line in a color space; and
a computer-implemented color modifier codeword determiner configured to determine a color modifying codeword representing a set of multiple color modifiers for modifying said multiple discrete color representations along at least one selected extension vector in said color space to obtain, for each of said discrete multiple color representations, a set of multiple color points, wherein said multiple color points of said sets are located on a surface defined by said multiple color representations and said at least one selected extension vector and wherein colors of said image elements are approximated by said multiple color points of said sets.

26. A method of processing a compressed representation of an image block comprising:
defining multiple discrete color representations along a line in a color space using a first and a second color codeword;
representing, using a color modifying codeword, a set of multiple color modifiers for modifying said multiple discrete color representations along at least one selected extension vector in said color space to obtain, for each of said discrete multiple color representations, a set of multiple color points, said multiple color points of said sets being located on a surface defined by said multiple color representations and said at least one selected extension vector,
said method selecting, for at least one image element in said image block, a color value from said multiple color points using a computer-implemented color value selector.

27. The method according to claim 26, wherein said multiple color points of said sets collectively forming a grid on said surface and selecting step comprises the step of selecting, for at least one image element in said image block, a color value from said grid of multiple color points.

28. The method according to claim 26, wherein said compressed representation further comprises:
a color index sequence comprising, for each image element in said image block, a color index representing a color representation of said multiple color representations; and
a color modifier index sequence comprising, for each image element in said image block, a color modifier index representing a color modifier of said set of multiple color modifiers, wherein selecting said color value comprises selecting, based on a color index associated with said at least one image element and a color modifier index associated with said at least one image element, said color value from said grid of multiple color points.

29. The method according to claim 28, wherein selecting said color value comprises:
determining, based on said first and second color codeword and said color index associated with said at least one image element, a color representation of said multiple discrete color representations;
selecting, based on said color modifying codeword and said color modifier index associated with said at least one image element, a color modifier from said set of multiple color modifiers; and generating said color value by modifying said determined color representation along said at least one extension vector using said selected color modifier.

30. The method according to claim 29, wherein determining said color representation comprises determining said color representation as a linear combination of said first and second color codeword.

31. The method according to claim 28, wherein said compressed representation further comprises a direction codeword and selecting said color value comprises:

determining, based on said first color codeword, a starting color representation;

determining, based on said direction codeword, a direction vector;

providing, based on said second color codeword, a set of multiple modifiers;

selecting, based on said color index associated with said at least one image element, a modifier from said set of multiple modifiers;

generating a color representation of said multiple discrete color representations by modifying said determined starting color representation with said selected modifier along said direction vector;

selecting, based on said color modifying codeword and said color modifier index associated with said at least one image element, a color modifier from said set of multiple color modifiers; and generating said color value by modifying said determined color representation along said at least one extension vector using said selected color modifier.

32. The method according to claim 28, wherein said color modifying codeword comprises a representation of a minimum color modifier and a representation of a maximum color modifier and selecting said color modifier comprises:

calculating, based on said color modifying codeword, said multiple color modifiers as linear combinations of said maximum color modifier and said minimum color modifier; and selecting, based on said color modifier index associated with said at least one image element, a color modifier from said multiple calculated color modifiers.

33. The method according to claim 28, further comprising:

providing, based on said color modifying codeword, said set of multiple color modifiers; and selecting, based on said color modifier index associated with said at least one image element, a color modifier from said set.

34. A computer program product stored on a computer-readable medium and defining a block decoder for processing a compressed representation of an image block including a first and a second color codeword defining multiple discrete color representations along a line in a color space; said computer program product comprising instructions which, when executed by a computer;

modify said multiple discrete color representations along at least one selected extension vector in said color space based on a color modifying codeword representing a set of multiple color modifiers to obtain, for each of said discrete multiple color representations, a set of multiple color points, said multiple color points of said sets are located on a surface defined by said multiple color representations and said at least one selected extension vector, and select, for at least one image element in said image block, a color value from said multiple color points.

35. A block decoder for processing a compressed representation of an image block comprising:

a first and a second color codeword defining multiple discrete color representations along a line in a color space; and a color modifying codeword representing a set of multiple color modifiers for modifying said multiple discrete color representations along at least one selected extension vector in said color space to obtain, for each of said discrete multiple color representations, a set of multiple color points, said multiple color points of said sets are located on a surface defined by said multiple color representations and said at least one selected extension vector, said block decoder comprising:

a computer-implemented color value selector configured to select, for at least one image element in said image block, a color value from said multiple color points.

36. A user terminal comprising:

a memory for storing a compressed representation of an image block comprising:

a first and a second color codeword defining multiple discrete color representations along a line in a color space; and a color modifying codeword representing a set of multiple color modifiers for modifying said multiple discrete color representations along at least one selected extension vector in said color space to obtain; for each of said discrete multiple color representations, a set of multiple color points, said multiple color points of said sets are located on a surface defined by said multiple color representations and said at least one selected extension vector;

a computer-implemented block decoder for processing said compressed representation of said image block, said block decoder comprising:

a color value selector configured to select, for at least one image element in said image block, a color value from said multiple color points.

37. The user terminal according to claim 36, wherein said multiple color points of said sets collectively forming a grid on said surface and color value selector is arranged for selecting, for at least one image element in said image block, a color value from said grid of multiple color points.

38. The user terminal according to claim 36, wherein said compressed representation further comprises:

a color index sequence comprising, for each image element in said image block, a color index representing a color representation of said multiple color representations; and a color modifier index sequence comprising, for each image element in said image block, a color modifier index representing a color modifier of said set of multiple color modifiers, said color value selector is configured to select, based on a color index associated with said at least one image element and a color modifier index associated with said at least one image element, said color value from said grid of multiple color points.

39. The user terminal according to claim 38, wherein said color value selector comprises:

means for determining, based on said first and second color codeword and said color index associated with said at least one image element, a color representation of said multiple discrete color representations;

a color modifier selector for selecting, based on said color modifying codeword and said color modifier index associated with said at least one image element, a color modifier from said set of multiple color modifiers; and means for generating said color value by modifying said determined color representation along said at least one extension vector using said selected color modifier.

40. The user terminal according to claim 39, wherein said determining means is arranged for determining said color representation as a linear combination of said first and second color codeword.

41. The user terminal according to claim 39, wherein said compressed representation further comprises a direction codeword said color value selector comprises:
- means for determining, based on said first color codeword, a starting color representation;
- means for determining, based on said direction codeword, a direction vector;
- means for providing, based on said second color codeword, a set of multiple modifiers;
- a modifier selector for selecting, based on said color index associated with said at least one image element, a modifier from said set of multiple modifiers;
- means for generating a color representation of said multiple discrete color representations by modifying said determined starting color representation with said selected modifier along said direction vector;
- a color modifier selector for selecting, based on said color modifying codeword and said color modifier index associated with said at least one image element, a color modifier from said set of multiple color modifiers; and
- means for generating said color value by modifying said determined color representation along said at least one extension vector using said selected color modifier.

42. The user terminal according to claim 38, wherein said color modifying codeword comprises a representation of a minimum color modifier and a representation of a maximum color modifier and said user terminal comprises a color modifier selector in turn comprising:
- means for calculating, based on said color modifying codeword, said multiple color modifiers as linear combinations of said maximum color modifier and said minimum color modifier; and
- a selector for selecting, based on said color modifier index associated with said at least one image element, a color modifier from said multiple calculated color modifiers.

43. The user terminal according to claim 38, further comprising a color modifier selector in turn comprising:
- means for providing, based on said color modifying codeword, said set of multiple color modifiers; and
- a selector for selecting, based on said color modifier index associated with said at least one image element, a color modifier from said set.

* * * * *

UNITED STATES PATENT AND TRADEMARK OFFICE
CERTIFICATE OF CORRECTION

| | | |
|---|---|---|
| PATENT NO. | : 7,787,691 B2 | Page 1 of 1 |
| APPLICATION NO. | : 11/401444 | |
| DATED | : August 31, 2010 | |
| INVENTOR(S) | : Ström | |

It is certified that error appears in the above-identified patent and that said Letters Patent is hereby corrected as shown below:

On Page 2, item (56), under "OTHER PUBLICATIONS", in Column 2, Line 29, delete "IEEEE" and insert -- IEEE --, therefor.

In Column 2, Line 48, after "object" delete "invention".

In Column 2, Line 54, after "by the" delete "invention".

In Column 18, Line 43, delete "tensity" and insert -- intensity --, therefor.

In Column 20, Line 12, delete "41B, 41B" and insert -- 41B, 41C --, therefor.

In Column 36, Line 27, in Claim 26, after "codeword;" insert -- and --.

In Column 37, Line 56, in Claim 34, delete "computer;" and insert -- computer: --, therefor.

Signed and Sealed this
First Day of February, 2011

David J. Kappos
*Director of the United States Patent and Trademark Office*